United States Patent
Wilson et al.

(10) Patent No.: US 6,637,522 B2
(45) Date of Patent: *Oct. 28, 2003

(54) ENHANCED COMPUTER CONTROL OF IN-SITU DRILLING SYSTEM

(75) Inventors: Henry E. Wilson, Ironton, OH (US); Gregory E. Hinshaw, Proctorville, OH (US); William S. McIntyre, Proctorville, OH (US)

(73) Assignee: J. H. Fletcher & Co., Inc., Huntington, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/900,570

(22) Filed: Jul. 6, 2001

(65) Prior Publication Data

US 2001/0050186 A1 Dec. 13, 2001

Related U.S. Application Data

(63) Continuation-in-part of application No. 09/835,658, filed on Apr. 16, 2001, now abandoned, which is a continuation of application No. 09/198,327, filed on Nov. 24, 1998, now Pat. No. 6,216,800.
(60) Provisional application No. 60/236,834.

(51) Int. Cl.[7] .............................................. E21B 21/08
(52) U.S. Cl. ............................. 175/25; 175/27; 175/48; 175/71; 175/212
(58) Field of Search ........................... 175/25, 27, 38, 175/48, 66, 67, 71, 212, 213; 173/3–11

(56) References Cited

U.S. PATENT DOCUMENTS

| | | |
|---|---|---|
| 2,259,694 A | 10/1941 | Hoffar |
| 2,771,272 A | 11/1956 | Miller |
| 2,843,361 A | 7/1958 | Miller |
| 2,975,847 A | 3/1961 | Feucht |
| 3,324,717 A | 6/1967 | Brooks et al. |
| 3,613,805 A | 10/1971 | Lindstad |
| 3,670,826 A | 6/1972 | Hanson et al. |
| 3,870,111 A | 3/1975 | Tuomela et al. |

(List continued on next page.)

FOREIGN PATENT DOCUMENTS

| | | | |
|---|---|---|---|
| JP | 4-327686 | | 11/1992 |
| JP | 4-327687 | | 11/1992 |
| JP | 4-327688 | | 11/1992 |
| JP | 4-327689 | | 11/1992 |
| JP | 406108768 A | * | 4/1994 |
| JP | 6-190746 | | 7/1994 |
| WO | PCT/CA96/00848 | | 7/1997 |
| WO | PCT/FI97/00400 | | 12/1997 |

OTHER PUBLICATIONS

JB Segui and M Higgins, "Blast Design Using Measurement While Drilling Parameters" Explo 2001, Hunter Valley, NSW, Oct. 28–31, 2001.

Primary Examiner—David Bagnell
Assistant Examiner—Zakiyn Walker
(74) Attorney, Agent, or Firm—King & Schickli, PLLC

(57) ABSTRACT

An apparatus and method is provided for substantially continuously drilling and disposing of drill cuttings and dust to minimize airborne contamination while providing protection against overload using enhanced computer control. A drill stem with a bit is used to form the drill hole. A flushing mechanism utilizes vacuum or pressurized water to create a bailing fluid flow for flushing the cuttings and dust from the drill hole for disposal. A transducer monitors at least one first parameter of the bailing fluid flow, and a sensor may also monitor at least one second parameter of a flow of a driving fluid under pressure for feeding the drill stem and bit into the earth. A controller is utilized to regulate the rate of feed and/or driving of the stem and bit dependent on the levels of the parameters being monitored.

59 Claims, 11 Drawing Sheets

U.S. PATENT DOCUMENTS

| | | |
|---|---|---|
| 3,910,360 A | 10/1975 | Sundstrom |
| 3,946,818 A | 3/1976 | Ek |
| 3,968,845 A | 7/1976 | Chaffin |
| 4,036,308 A | 7/1977 | Dellenberg |
| 4,157,231 A | 6/1979 | Phillips |
| 4,223,748 A | 9/1980 | Barendsen |
| 4,354,233 A | 10/1982 | Zhukovsky et al. |
| 4,434,861 A | 3/1984 | Howeth |
| 4,503,918 A | 3/1985 | Bergkvist et al. |
| 4,606,415 A | 8/1986 | Gray, Jr. et al. |
| 4,662,608 A * | 5/1987 | Ball .................. 254/273 |
| 4,694,439 A | 9/1987 | Moll |
| 4,793,421 A | 12/1988 | Jasinski |
| 4,848,485 A | 7/1989 | Piipponen et al. |
| 4,880,065 A | 11/1989 | McDonald et al. |
| 4,936,397 A | 6/1990 | McDonald et al. |
| 4,953,639 A | 9/1990 | Hamner et al. |
| 5,048,620 A | 9/1991 | Maher |
| 5,121,802 A | 6/1992 | Rajala et al. |
| 5,129,464 A | 7/1992 | Richier |
| 5,168,937 A | 12/1992 | Hamner |
| 5,253,961 A | 10/1993 | Geissler |
| 5,307,883 A | 5/1994 | Jenne |
| 5,320,188 A | 6/1994 | England |
| 5,348,106 A | 9/1994 | Mattero |
| 5,348,107 A | 9/1994 | Bailey et al. |
| 5,358,058 A | 10/1994 | Edlund et al. |
| 5,409,072 A | 4/1995 | Enlund et al. |
| 5,425,188 A | 6/1995 | Rinker |
| 5,449,047 A | 9/1995 | Schivley, Jr. |
| 5,465,798 A | 11/1995 | Edlund et al. |
| 5,474,142 A | 12/1995 | Bowden |
| 5,699,261 A | 12/1997 | Muona |
| 5,746,278 A | 5/1998 | Bischel et al. |
| 5,771,981 A | 6/1998 | Briggs et al. |
| 5,844,133 A | 12/1998 | Goto et al. |
| 5,913,371 A | 6/1999 | Jenne |
| 5,944,121 A | 8/1999 | Bischel et al. |
| 6,009,959 A * | 1/2000 | Dietzen .................. 175/66 |
| 6,016,878 A | 1/2000 | Jansson |
| 6,029,754 A | 2/2000 | Kattentidt et al. |
| 6,209,662 B1 | 4/2001 | Stahl |
| 6,216,800 B1 | 4/2001 | Wilson et al. |
| 6,253,860 B1 | 7/2001 | Poysti et al. |
| 6,257,354 B1 | 7/2001 | Schrader et al. |

* cited by examiner

ENHANCED COMPUTER CONTROL OF IN-SITU DRILLING SYSTEM

This application claims the benefit of U.S. Provisional Patent Application Ser. No. 60/236,834, filed Sep. 29, 2000, and is a Continuation-in-Part of U.S. patent application Ser. No. 09/835,658, filed Apr. 16, 2001 and now abandoned, which is a continuation of U.S. patent application Ser. No. 09/198,327, filed Nov. 24, 1998, now U.S. Pat. No. 6,216,800, issued Apr. 17, 2001.

TECHNICAL FIELD

The present invention relates to an improved system for in-situ drilling, and more particularly, to a system where the rate of drilling or other aspects of the drilling operation are regulated or controlled by monitoring one or more parameters, including a parameter of the fluid flow for disposing of the cuttings and dust.

BACKGROUND OF THE INVENTION

Most earth drilling systems employ some form of rotary or percussion powered drills. Many advances in recent years have made the drilling operation more efficient to create better and faster drilling speeds, especially in rock layers. Typically, a drilling machine, such as for forming a hole for an explosive charge or for anchoring a roof bolt, includes a drill stem with a drill bit on the distal down hole section thereof. The stem/bit on a rotary drill machine is rotated by a spinner mounted on a drill head to form the drill hole. The rotary driving motion of the spinner is usually hydraulically or pneumatically generated and manually regulated by the operator of the drill machine.

Due in part to the advances in the technology, such as in regard to the drill bit and/or components of the drilling machine providing attendant easier and faster drilling, operators have become accustomed to set the controls to try to drill the hole in the least amount of time. In doing so, the spinner head is rotated and the feed of the drill head is engaged to move the drill stem into the hole as rapidly as possible. The operator typically changes these settings only in the event that a problem develops.

As a part of the more efficient drilling, the cuttings and dust must be collected and removed from adjacent the drill bit so that clean cutting edges are provided at the bottom of the hole to allow the most efficient contact with the rock, or other strata. Typically, a pneumatic or hydraulic cuttings/dust collection/suppression and removal system is employed. Pressurized air, or a suitable hydraulic fluid such as water, or an air/water mixture, is forced down a center passage through the drill stem to bail or pick up the cuttings and dust for disposal. It is also known to impose a vacuum on the center passage of the drill stem drawing air into the hole around the periphery of the drill stem, whereupon the cuttings and the dust particles are entrained and removed through the center passage. In either system, this withdrawn debris is pneumatically or hydraulically conveyed away from the drill hole. When using air, the cuttings and dust are then filtered out and disposed of in an appropriate manner. In systems where water is used, either exclusively or in a mixture with other fluids, an option is to simply allow the dust to be suppressed and then deposited outside the drill hole. In either case, airborne contamination is advantageously substantially eliminated.

A typical drilling arrangement and cuttings/dust collecting system is shown in U.S. Pat. No. 4,434,861 to Howeth. In this patent, the bailing air is supplied through the center passage of the drill stem and the cuttings/dust is removed from the hole by a vacuum head. Insofar as the '861 disclosure is concerned, the advancement of the drill stem into the hole, and the rotation of the drill bit, are manually controlled by the operator. Other functions of the drilling system are however automatically controlled, such as the extending or retracting the drill stem with respect to the deck plate. In other words, the drill stem extends to the drilling position only when the drill stem is supplied with sufficient bailing air to be operative, and the drill stem is automatically retracted from the hole when the bailing air supply is terminated (see col. 14, lines 14–37).

Another feature of the Howeth patent is to provide an improved vacuum skirt around the hole and the drill stem so as to attempt to improve the sealing, and thus enhance the efficiency of the bailing operation by reducing the tendency of the bailing system to choke or overload. This patent also teaches the fundamental premise of making certain that the passageways are proportioned sufficiently larger than the drill hole to also help alleviate choking of the bailing air carrying the cuttings/dust (see column 14, lines 38–66). While this overall system is an improvement over prior art drilling machines, problems still arise with regard to choking or overloading the vacuum system, especially where the drill speed is increased beyond normal levels and when strata containing soft minerals, coal, shale, mud stone or the like debris are encountered in the drilling operation.

Other patents, such as U.S. Pat. No. 3,946,818 to Ek, disclose the efforts to improve the sealing of the skirt in a different manner for improving the flow so that choking does not occur as readily. Heretofore, approaches other than these stop gap methods to solve the same problem have simply not been successful, insofar as we are aware. In theory, the operator of the drilling machine is simply depended upon to try to anticipate any approaching choking or flow overload situation and then shut the machine down. Unfortunately, in an overwhelming percentage of times, this is not possible because of the response time factor, and the collecting system becomes overloaded. The entire drilling operation must then be shut down for an extended period, the drill stem and bit removed from the drill hole and all passageways cleared of the debris. Alternatively, drilling must be performed at a continuously reduced rate to compensate and thus prevent these intermittent overload conditions. This speed reduction obviously detracts from the efficiency of the overall drilling operation, especially in the usual case where the operator must drill several hundred boreholes per shift.

Other inventors have concentrated on improving other aspects of the drilling machines, such as with respect to an improved cyclone filter, as set forth in the England U.S. Pat. No. 5,320,188. Indeed, there have even been attempts to control the flow of pneumatic fluid to the drilling tool in an automatic fashion. In U.S. Pat. No. 4,936,397 to McDonald et al., the pneumatically controlled valve is operable to transmit an initial, extra strong pulse of air to initiate operation of the down hole drilling motor. Once the motor is operating, the valve is kept open at a lower pressure than is required to open it so that the drilling can continue at a lower energy level.

Similarly, energy saving is the impetus in U.S. Pat. No. 5,409,072 to Enlund et al., wherein the pneumatic air supply is provided by a compressor driven by a hydraulic drive motor with adjustable displacement. The pneumatic pressure supplied by the compressor is adjusted inversely proportional to the pressure primarily used to drive the percussion drill along its linear path, and/or the input pressure of the drive motor itself. In this manner, it is proposed that the energy required to operate the entire system is maintained substantially constant during all phases of the operation.

Thus, while many refinements have been made in drilling machines and their method of operation, there is a marked absence of more responsive control systems, and more particularly with regard to regulating the drill feed and driving in response to one or more parameters, such as the thrust acting on the bit or the pressure of the bailing fluid used in the cuttings/dust collecting or suppression system. Such concepts would have specific usefulness in improving the drilling efficiency especially for forming small (20–50 mm) diameter holes using rotary cutting tools and high tool feed forces. In such an arrangement, we have discovered that it would be especially advantageous to keep the drill penetration rate as rapid as possible, while at the same time controlling the rate of tool advance and/or rotation using feedback from the drill feed system and/or the cuttings/dust collection or suppression system. In this manner, clogging or overload and the deleterious side effects are avoided, while the service life of the bit is maximized. What we envision as a need in the underground mining industry, and particularly for drilling small diameter holes for installation of roof bolts, explosive charges or the like, is such an automatic control of not only the drilling operation, but also of various components associated therewith using a system that is simple in design and reliable in operation.

SUMMARY OF THE INVENTION

In accordance with a first aspect of the invention, an improved apparatus and method for controlling the operation of a drill stem and drill bit based on monitoring at least the status of the fluid flushing mechanism is provided. More specifically, the apparatus provides for substantially continuous in-situ drilling, collecting and disposing or suppression of the drill cuttings/dust by feedback of the level of negative or positive gauge pressure maintained in the flushing mechanism through a programmable controller. The control circuit is preferably a low power (4–20 ma) electronic circuit that is approved for all underground mines. Alternatively, a hydraulic or electro-hydraulic circuit providing a comparable function is contemplated. The inventive system is targeted primarily for forming small (20–50 mm) holes in virtually any type of mining operation, including soda ash, coal, trona, salt, potash, limestone, gypsum or the like.

In one embodiment for carrying out this principle, the apparatus comprises a drill stem having a drill bit, a feed device for feeding the stem/bit to form the drill hole, and a mechanism for flushing the cuttings/dust from the hole and conveying it to a remote location. A transducer tracks at least one parameter of the flow in order to provide a signal to the controller for regulating the rate of drilling so as to anticipate an approaching overflow condition. By utilizing such a system, the cuttings/dust and other debris are efficiently removed to eliminate or minimize airborne contamination. This objective is accomplished in a controlled manner without ever reaching an overload condition in the flushing mechanism that could lead to clogging and deleterious downtime.

The parameter may be sensed through the transducer coupled to a transfer duct of the flushing mechanism. The feedback arrangement provides for a corresponding signal to be generated by the transducer indicative of the pressure in the duct. In return, the controller is operative to regulate the operation of the feed device for the drill head to vary the rate of feed dependent on the signal level. In addition, the drive unit for rotating the drill stem/bit can be controlled in concert with the feed.

Given the objective requirement for simplicity, the flushing mechanism includes for vacuum generation a standard blower connected to the transfer duct through a filtering system assembly, including a standard filter. The filter may comprise tortuous path, cylinder cartridges and/or cyclone filters, and as outlined in detail below, the system may include a pre-cleaner for removing larger particles from the bailing fluid flow and prevent them from reaching the filter. The filter is typically designed to capture relatively small or fine particles only, and is subject to overloading if the pre-cleaner is not regularly emptied. Hence, the pre-cleaner must be periodically emptied/cleaned to dispose of the larger particles of the cuttings, as well as any smaller dust particles. Using the control of the present invention, the pre-cleaner may also be caused to automatically empty, such as based on reaching a particular point in the drilling cycle.

The controller can be used to program and adjust the threshold level of the pressure corresponding to the approaching overload so that maximum drilling efficiency is obtained for any particular type of mining, or related operation, being performed. The window of operation is set to ensure substantially continuous drilling and eliminate false signals of approaching overload. The upper and lower thresholds of the gauge pressure in the flushing mechanism can be varied to establish the optimum rate of feed and/or drilling rotation.

In a second embodiment, the flushing mechanism utilizes pressurized fluids, such as water. The fluid is pumped through the center passage of the stem/bit. A slurry of cuttings/dust is formed and forced out of the drill hole for easy disposal, while simultaneously suppressing the dust to eliminate airborne contamination. Any increase in positive gauge pressure is sensed through the transducer in the transfer duct to anticipate any approaching overload condition. As in the preferred embodiment, corrective adjustment is automatically made in the drilling rate.

With respect to the related method, the in-situ drilling and collecting or suppressing of the drill cuttings and dust from the drill hole includes drilling the hole with a drill stem and bit, flushing the cuttings/dust from the drill hole, monitoring at least one parameter of the flow of the bailing fluid, and regulating the rate of drilling to control the parameter during both a normal and approaching overflow condition. By use of this method, the drilling operation can be continuous as the collection or suppression of cuttings and dust from the drill hole is carried out in a controlled manner.

In accordance one version of the method, the parameter being monitored is the vacuum or negative fluid pressure level in the flushing mechanism. The regulating step is preferably concerned with the rate of feed of the drill stem into the drill hole. That is, the feed rate, including from zero to maximum, is made dependent on at least the signal level of the negative gauge pressure sensed in the transfer duct during the step of collecting and conveying the cuttings/dust or otherwise suppressing the dust. As an additional feature, the use of a programmable controller, or an equivalent adjustable operating hydraulic or electro-hydraulic valve, allows the addition of the step of adjusting the threshold of the approaching overload of the flushing mechanism for maximum efficiency. Also, adjustment of the reset window of the gauge pressure is contemplated. Close control of the threshold and the reset window helps in establishing the optimum rate of feed for the drill stem and thus the drilling efficiency.

In more specific terms, in the case of vacuum flushing, the adjusting step is performed by setting the threshold level of the vacuum/negative gauge pressure in the range of 10% to 20% above the normal negative pressure level, and to reset to normal vacuum within 0.5–4 inches Hg. as the threat of the overload is passed. If desired, the regulating step can include changing the speed of the rotary driving of the drill stem, also depending on the signal level from the transducer and coordinated with the linear feed rate of the drill stem.

Thus, under optimum operating conditions, the regulating step can perform so as to maintain the parameter in the flushing mechanism, such as the vacuum level or rate of flow of the fluid, so as to be substantially constant. Also, while the regulating step, as controlled by the programmable controller, can be made to vary the drill head feed and the spinner rotation, the preferred embodiment at present is to actually stop the feed of the drill stem and/or the spinner during an approaching overload condition, and to automatically restart the feed/rotation at the optimum rate when the potential or threatened overload condition is past.

A related aspect of the invention is to also automatically control other aspects of the drilling operation. For instance, the emptying of a component of the filtration system, or the opening and closing of structures, such as the clamp on the drill guide, may be effected at a particular point in the drilling operation, such as in response to the position of the drill stem/bit. Such automatic control eliminates the need for constant operation intervention, and may reduce the chance of errors. Using a manul input device, such as a joystick, to switch from automatic to manual control is also possible to allow the operator to take over in the event a problem arises.

In accordance with yet another aspect of the invention, a method and apparatus for controlling the drilling automatically based not only on a parameter of the bailing fluid flow, but also on a sensed parameter relating to the thrust experienced by the drill bit or stem is disclosed. In one embodiment, the apparatus comprises a feed device for feeding the drill stem and bit to form the drill hole at a feed rate corresponding to a first flow of a driving fluid under pressure. A sensor monitors a first parameter relating to the thrust acting on the drill stem and bit, such as by monitoring the feed pressure of the first flow of the driving fluid, and generates a first signal. Additionally, a flushing mechanism is provided for flushing cuttings and dust from the hole by bailing fluid flow. A transducer monitors a second parameter of the bailing fluid flow, such as the negative or positive gauge pressure, to the loading of the flushing mechanism and generates a second signal. A controller is responsive to the levels of the first and second signals for substantially automatically and continuously regulating at least the feed rate depending on one of the thrust acting on the drill bit or the loading of the flushing mechanism. As a result of regulating the feed rate based on both thrust and the operation of the flushing mechanism, not only is the consumption of the bit reduced, but the overall drilling operation is also optimized by preventing overloading.

In one embodiment, the controller controls a first directional value to regulate the first flow to maintain an optimum feed rate corresponding to a particular level of thrust. Preferably, the first valve is initially adjusted by the controller to maintain the flow such that the drill bit is fed at a preselected feed rate for the bit, which may be chosen according to the particular strata being drilled. Then, the position of the first valve is selectively adjusted by the controller during feeding in accordance with the level of the first signal, which is preferably a sensed feed pressure, to regulate the first flow until an optimum feed rate corresponding to the optimum level of thrust experienced by the drill bit. To prevent overloading, the controller maintains the optimum feed rate to keep the thrust at or below a predetermined target thrust. The target thrust is below a maximum predetermined level that may result in excessive wear on the bit or bending of the drill stem. The target level of thrust may be selected by the operator based on the particular bit and the drilling conditions.

Preferably, the first valve is adjusted by the controller to regulate the first flow to maintain the feed rate at a certain level or decrease it a predetermined amount when a substantial decrease in the feed pressure signal is detected by the controller, such as in response to the drill bit encountering a void in the earth. The amount of the substantial decrease in the feed pressure required to cause the controller to reduce the feed rate and the predetermined amount of the reduction are both selectively adjustable, such as by the drill operator during set-up, based on the particular drill bit or drilling conditions. The controller may also adjust the position of the first valve to reduce the flow of the driving fluid and hence the feed rate a predetermined amount when the feed pressure falls below a predetermined level indicative of a low thrust condition, such as when the drill bit encounters a strata in the earth substantially comprised of a soft material.

A drive unit for driving the drill bit at an initial rotational speed may also be provided. The rotational speed is regulated by the controller by adjusting the position of a second directional valve through which a second flow of a driving fluid under pressure passes to the drive unit. The controller may continuously regulate the position of the second valve to maintain the rotational speed at an optimum level based on the feed rate. Preferably, the controller prevents the second valve from closing beyond a certain point to maintain the rotational speed at or above a minimum level, or from opening beyond a certain point such that the rotational speed exceeds a maximum level, regardless of the feed rate dictated based on the sensed parameters.

The controller may also be programmed to include a first threshold level of the gauge pressure of the bailing fluid flow. Depending on the level of the gauge pressure relative to this threshold level, the controller may also adjust the first valve regulating the first flow of fluid to the feed device to regulate the feed rate. In particular, in the case where this first threshold level is exceeded, the controller either maintains the valve at the current position or adjusts the first valve to decrease the feed rate when the signal level reaches the first threshold level. In addition, the controller may operate to: (1) prevent the first valve from opening to increase the feed rate from the optimum level if the gauge pressure remains within a predetermined range above the first threshold level and signal a burst of rotary speed; (2) close the first valve to reduce the feed rate from the optimum level if the signal level of the gauge pressure exceeds a predetermined range above the first threshold level and signal a burst of rotary speed; and (3) close the first valve to stop the feeding of the drill bit and signal the feed unit to back the drill bit out of the hole a predetermined distance when a second threshold level of the gauge pressure that exceeds the predetermined range is reached. In the latter case, the controller may also open the first valve to resume the feeding of the drill bit once the signal level drops below the first threshold level.

A related aspect of the invention is to provide a method for automatically controlling the feeding of a drill stem and bit into the earth for forming a drill hole. The method comprises feeding the drill stem and bit into the earth at a feed rate; flushing the cuttings and dust from the drill hole by bailing fluid flow; continuously monitoring a first parameter relating to a thrust acting on the drill bit during feeding and a second parameter relating to the bailing fluid flow; and automatically and continuously regulating at least the feed rate based on one, and preferably both of the first and second parameters. As a result, the cuttings and dust are flushed in a controlled manner to substantially eliminate airborne contamination in a continuous and optimum drilling operation, while consumption of the bit is simultaneously optimized by controlling the feed rate based on thrust.

In one embodiment, the feed rate is initially set at a predetermined feed rate for the drill bit selected for a particular job, based on the drilling conditions. From this level, the feed rate is continuously regulated, which maintains the feed horsepower at a substantially constant level. In addition to optimizing energy use, controlling the feeding in accordance with the thrust reduces wear on the bit and extends its service life. Preferably, a predetermined target level of thrust is stored that is less than a level that may result in damage to the bit or stem, and the regulating step includes preventing the first parameter from exceeding this target level of thrust, such as by regulating the feed rate. This "clipping" addresses any lag in the response time required to make an adjustment in the feed rate to avoid reaching excessive thrust levels, and thus reduces the potential for a catastrophic failure.

The method may further include the step of maintaining the feed rate at a predetermined level or reducing the feed rate a predetermined amount when a substantial decrease in the first parameter corresponding to the thrust occurs, such as in response to the drill bit encountering a void in the earth. The amount of the substantial decrease in the first parameter relating to thrust required to trigger the reducing of the feed rate is preferably selectively adjustable, such as by the drill operator, to avoid nuisance trips. The amount of the reduction in the feed rate, or the predetermined level, may also be selectively adjusted. In addition to this void detection feature, the method may include reducing the feed rate a predetermined amount or setting it at a predetermined level when the first parameter falls below a predetermined value corresponding to a low thrust condition. This low thrust condition may result when the drill bit encounters a strata in the earth substantially comprised of a soft material.

Preferably, the step of feeding further includes simultaneously rotating the drill bit at a rotational speed that is dependent on the feed rate. In this case, the regulating step may include preventing the rotational speed of the drill bit from dropping below a predetermined minimum level or exceeding a maximum level regardless of the feed rate. Advantageously, this prevents excessive rotational speeds from being reached at the upper end and stalling at the lower end, including even when the feed rate is adjusted to relatively low levels corresponding to high thrust conditions.

It is also preferable to perform the flushing by vacuum, in which case the second parameter being monitored is a negative gauge pressure of the bailing fluid flow. Thus, in addition to controlling the feed rate based on the thrust and the rotary speed based on the feed rate, the method may further include the steps of: (1) setting a first threshold level of the negative gauge pressure and maintaining the feed rate at a current level or decreasing the feed rate when the gauge pressure reaches the first threshold level, (2) preventing any increase in the feed rate if the signal level of the negative gauge pressure levels off, such as by remaining within a predetermined range above the first threshold level; and (3) reducing the feed rate if the signal level of the negative gauge pressure exceeds a predetermined range above the first threshold level. These steps further enhance the drilling operation by preventing deleterious clogging resulting from an overload of the flushing mechanism. Signaling a burst in the rotary speed upon reaching the first threshold level is also desirable for this purpose.

Stopping the feeding of the drill bit and backing it out of the drill hole a predetermined distance may also be effected when a second, threshold level of the negative gauge pressure exceeding the predetermined range is reached. This serves to prevent a failure in the event of excessive clogging, such as when a strata comprised of clay or the like is encountered. Feeding is resumed at the optimum rate once the signal level corresponding to the gauge pressure of the bailing fluid flow drops below the first threshold level.

DETAILED DESCRIPTION OF THE INVENTION

Figure 1:
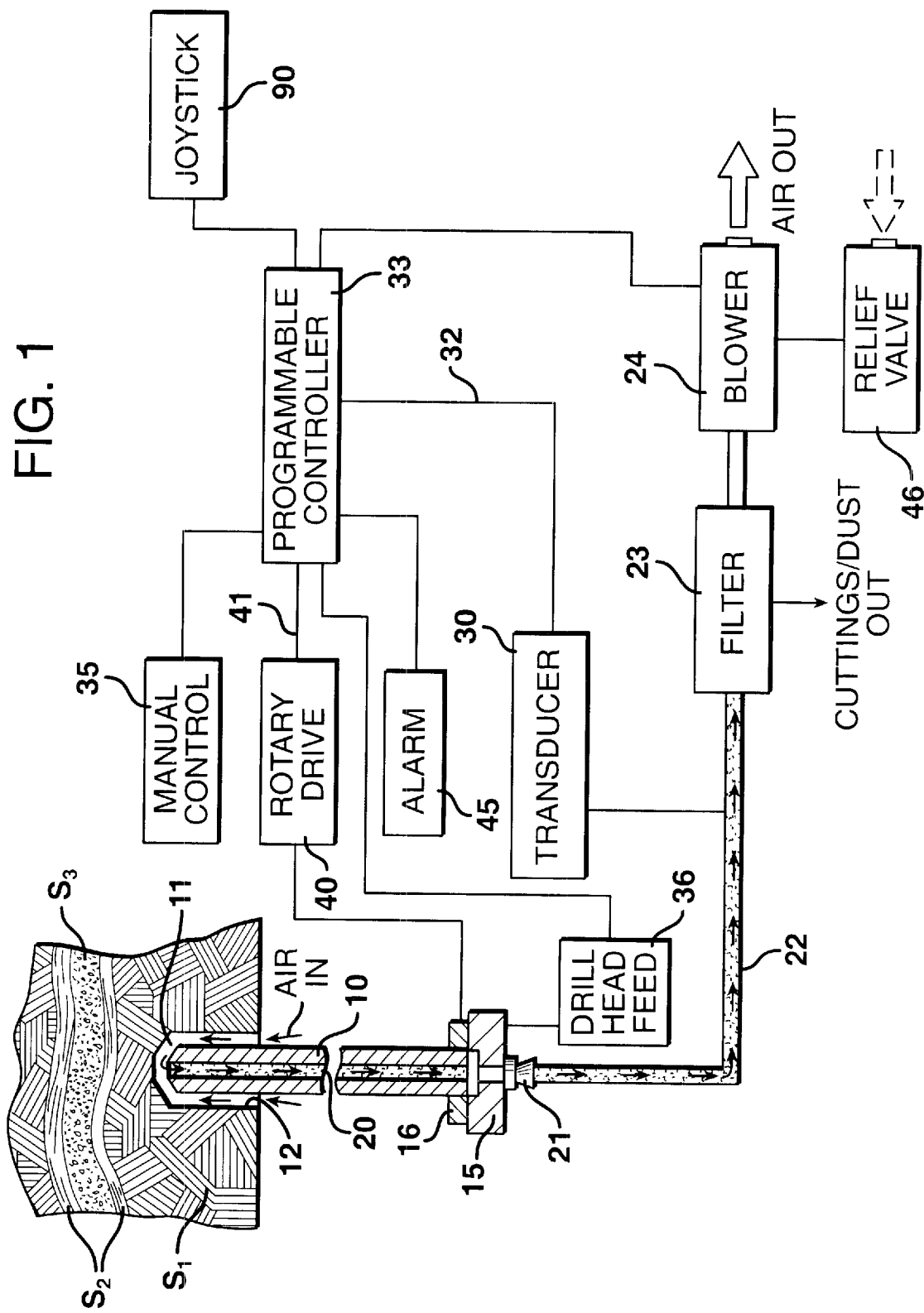
FIG. 1 is a schematic diagram of the drilling system of the present invention, including its preferred flushing mechanism using a vacuum and control circuit, and as applied to a rotating drill stem/bit for forming a drill hole in the earth having variable strata.
Figure 2:
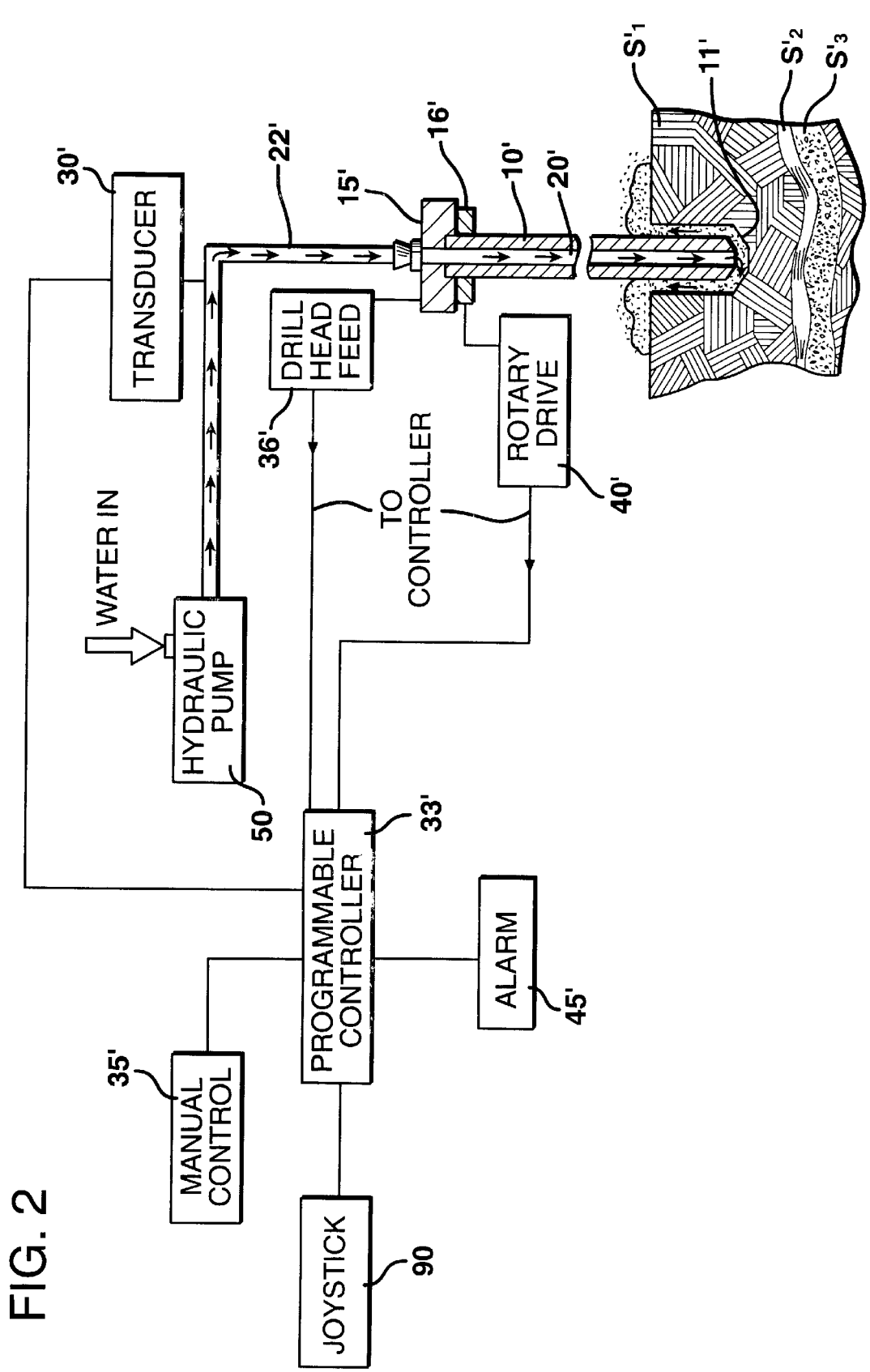
FIG. 2 is a similar schematic diagram of the alternative embodiment using a pressurized hydraulic fluid for flushing the drill hole for suppression of the dust, rather than a vacuum for flushing and remote disposal.

With reference now to FIGS. 1 and 2 of the drawing, an in-situ drilling system is illustrated that represents in a schematic fashion the important aspects of one embodiment of the present invention, both in the apparatus and method form. The particular representation in FIG. 1 is typical of drilling in the ceiling of a mine having rock strata $S_1$. Additional overburden includes representative seams of mud $S_2$ and soft rock/mineral or gravel $S_3$; it being understood as pointed out above that this representation is merely one environment in which the drilling system of the present invention can be utilized.

A drill stem 10 with a drill bit 11 formed on the distal, down hole end is provided for forming a drill hole, such as for placement of a roof bolt (not shown). The drill stem 10 is fed into the hole by force supplied by the drill head 15. The drill stem 10 and bit 11 are preferably of the rotary type, and are rotated by a rotary spinner 16. While this representative embodiment features a rotary drill, it is to be understood that in accordance with the broadest aspects of the invention, other forms, such as percussion drilling could be used. Also, in the drilling system of the present invention, the preferred range of the diameter of the drill hole is 20–50 mm; however, it is to be understood that other size holes can also be drilled using the same principles. Of course, in addition to drilling in overhead strata, the system of the present invention could be used in a side wall, or in the floor of any earth strata, as represented in the embodiment of FIG. 2, and for other purposes, including placement of explosive charges and the like.

The drill stem 10 and the drill bit 11 include a central passage 20 and the proximal end includes a coupling 21 for connection to a transfer duct 22. A filtration system, which in the embodiment of FIG. 1 includes at least a filter 23 (and possibly an upstream pre-cleaner and dust box; see, e.g., FIG. 10), is positioned in the transfer duct 22 to collect the cuttings and the dust formed by the drill bit 11 cutting into the rock (see upstream particle representations in the drawing). Downstream, a blower 24 with the intake side communicating with the filter 23 establishes the vacuum or negative gauge pressure through the filter 23, the transfer duct 22 and the drill stem/bit 10, 11. These components together form one embodiment of a flushing mechanism for the cuttings/dust that is bailed and removed from the bottom of the drill hole 12. As will be apparent, the bailing air flow established by the vacuum in the transfer duct 22 enters through the annular opening around the drill stem 10 and drill bit 11, picks up and removes the cuttings/dust particles and conveys the same to the filter 23 at a remote location. Periodically, the filter 23 or other components of the filtration system are emptied and cleaned allowing the cuttings/dust to be disposed of. As outlined further below, part of the enhanced computer control of the invention may involve controlling the emptying of components forming a part of the filtration system.

In accordance with an important aspect of this version of the apparatus forming a part of the present invention, a vacuum or negative gauge pressure transducer 30 is tapped into the transfer duct 22 to monitor the flow of the cuttings and dust. While the transducer 30 is the preferred component for monitoring this flow, other sensors could be substituted for monitoring different parameters, such as for example the actual flow rate of the bailing air as it passes through on the way to the filter 23. The transducer 30 provides an output signal over line 32 that represents the parameter being monitored in the transfer duct 22. A programmable controller 33 receives the signal and in a manner outlined further in the description which follows, provides for regulating the rate of drilling by the drill bit 11.

In this embodiment, the controller 33 is programmed to establish a normal drilling rate, and as long as the drill bit remains in the same rock strata $S_1$, this condition is not changed. However, upon entry into another type of strata, such as the soft mud strata $S_2$, the soft rock/mineral/gravel strata or other debris $S_3$, a controlled change is automatically made in accordance with the present invention. To do this, the controller 33 is connected by signal line to a drill head feed device 36, which as shown acts to apply linear force against the drill head 15. A pneumatic or hydraulic power source (such as a pump, see FIG. 3) provides this force that simply acts to push the drill head 15 into the drill hole 12 at a substantially constant rate. The constant rate continues until the drill bit 11 breaks through to the softer stratas $S_2$, $S_3$, at which time the threat of overload of the flushing mechanism 20–24 occurs.

According to the principles of one aspect of the present invention, the controller 33 through the transducer 30 senses this approach of the overload condition, and in response reduces the rate of feed supplied by the feed device 36. With the feed rate thus reduced, the passage 20 and the flushing mechanism 20–24 can recover by increasing the percentage of bailing air with respect to the mud/soft rock/gravel or the like that suddenly enters through the passage 20. As a result, choking or overload of the flushing mechanism 20–24 is avoided and the operation of the drilling system can continue as programmed in the most efficient manner.

To explain further, prior to the present invention, the soft strata material, especially if wet, would immediately tend to clog the passage through the stem/bit 10, 11. If an adjustment is not made, the vacuum system in general, and any flushing mechanism in particular, cannot remove the cuttings/dust fast enough to prevent solid plugging. When this occurs, the drill bit is isolated from the distal cutting face of the hole by the debris so that effective drilling cannot continue. Furthermore, such plugging as has occurred often in the past requires costly downtime for removal of the stem/bit from the hole and tedious cleaning of the entire flushing mechanism.

The controller 33 can be programmed in any suitable manner, such as through a manual control 35, and more specifically a keyboard. The rate of movement of the drill stem/bit 10, 11 being forced by the feed device 36 into the drill hole 12 can be regulated to slow to the degree necessary to allow the level of vacuum in the transfer duct 22 to recover to a safe, lower negative gauge pressure once the threat of overload has passed. However, a preferred, and broadly equivalent embodiment for the purposes of explaining the present invention, the forward advance of the feed device 36 is stopped during the regulation step. The controller 33 can set the threshold level at any desired point in order to safely anticipate the overload condition, and thus stop the feed in time to prevent the deleterious choking and clogging of the system that would otherwise require time consuming and expensive shutdown.

Typically, the vacuum or negative gauge pressure is set at a first threshold level of approximately 10–20% higher than the normal operating level of 10–18 inches Hg. This advantageously establishes the overall optimum rate of feed since the point of overload is never reached in practice. The reset level of the negative pressure is in the range of 0.5–4 inches Hg. These typical ranges do vary for different types of mines, or other applications, where the strata and operation conditions can vary significantly.

The controller 33 is also preferably connected to rotary drive unit 40 over signal line 41 that is connected to the spinner 16. As with the feed device 36, the drive unit 40 is connected to a power source, either pneumatic or hydraulic, in order to rotate the spinner 16. In addition to stopping or slowing the drill head feed, within the broadest aspects of the present invention the same and/or complimentary effect of preventing overload of the flushing mechanism 20–24 is achieved by coordinated regulating the speed of the spinner 16. In other words, by reducing the rotation of the drill bit, the amount of cuttings/dust and debris can be reduced instantaneously upon sensing a rise in the negative gauge pressure, thus giving the flushing mechanism time to recover to normal, lower negative pressure levels. Of course, as mentioned above, rather than a rotary drill, within the broadest aspects of the invention a percussion or other type drill can be used and drilling rate regulated.

The controller 33 can also activate an alarm 45 for the benefit of the operator of the roof bolting or other machine, that incorporates the drilling system of the present invention.

Also, as a precaution, a relief valve 46 can be provided on the blower 24 in order to prevent excessive vacuum from being generated in the unlikely event that a catastrophic overload occurs.

In a second embodiment, and with reference to FIG. 2, the key difference is the substitute of a hydraulic pump 50 for the blower 24, and pressurized water or other hydraulic fluid is used for flushing, instead of the vacuum and air. As illustrated, the like components are designated by the same reference numerals but including a prime designator. As is clear, the pressurized water (including water/air mixture, if desired) from pump 50 is forced through the transfer duct 22' and through the passage 20' of the stem/bit 10', 11'. A slurry of cuttings/dust is formed, forced out of the drill hole around the stem/bit and deposited on the floor. The dust that would otherwise provide airborne contamination is suppressed due to the wet condition of the slurry. The controller 33' in response to the positive gauge pressure monitored by the transducer 30' controls the feed device 36' and/or the drive unit 40' in the event that the back pressure signals an approaching overload due to clogging by debris, such as from the strata $S_2'$, $S_3'$. An alarm 45' signals the presence of the overload condition to the operator.

In one embodiment of the related method for in-situ drilling and flushing of the drill cuttings and dust, the steps comprise: drilling the hole with the drill stem/bit 10, 11 or 10', 11', feeding the same into the earth by the feed device 36, 36' acting on the drill head 15, 15' as the bit 11, 11' is effective to form the hole, flushing the cuttings/dust by bailing fluid flow through the flushing mechanism 20–24; 20', 22', 50 monitoring at least one parameter of the flow, such as negative or positive gauge pressure, and regulating the rate of drilling through the controller 33, 33' by a feedback signal to avoid an approaching overload condition if it occurs. As a result of this method, the cuttings/dust are collected or suppressed in a controlled manner, and in a substantially continuous drilling operation, providing for increased efficiency in any roof bolt/explosive charge installation, or related drilling operation.

In an exemplary version of the method, the parameter being monitored is the level of vacuum in the bailing air flow through the transfer duct 22. Once the vacuum level is raised due to an approaching overload condition, the feed of the drill head 15 is advantageously stopped, or reduced proportionally to the requirement that is sensed, in response to the rise in the vacuum/negative gauge pressure level. At any time, the particular threshold level where the feedback signal stops or reduces the feed can be reprogrammed through the manual control 35.

In addition, in the illustrated embodiments the regulating step may include stopping or reducing the speed of rotation of the spinner 16, 16' through the rotary drive unit 40, 40' upon sensing an increase in the gauge pressure by the transducer 30, 30' to the threshold level. In this instance, the controller 33, 33' coordinates the speed regulation through the spinner 16, 16' with the feed regulation of the feed device 36, 36' through the drill head 15, 15'. As in all instances of the method, once the potential overload condition is past, the feed and/or rotation of the drill stem 10, 10' and the drill bit 11, 11' is automatically returned to the optimum rate.

The programmable controller 33, 33' preferably includes a PLC or microprocessor that operates in a 4–20 milliamp low power range and approved for all types of mines by MSHA. Indeed, it is contemplated that the controller 33, 33' can be combined with various other sensors of the drilling system being monitored in order to help in regulating the entire drilling operation, as described further below. As necessary, the operator of the roof bolting machine, or other machine where the drilling system is utilized, can use manual controls 35, 35' to override or assist the automatic control of the control circuit of the present invention. However, the most significant advantages are attained by automatically anticipating an overload of the flushing mechanism 20–24; 20', 22', 50, supplying the bailing fluid, and thereby enhancing productivity of the drilling operation. The greatest benefit is in reducing downtime that would otherwise be needed to remove the drill stem/bit 10, 11; 10', 11' and clear the passageways of the flushing mechanism.

When working in soft minerals, such as trona, the negative or positive pressure levels detected in the transfer duct 22, 22' run comparable to drilling through strata of limestone, coal, shale or sand stone, or other debris such as in a coal mine. In other words, the trona as a soft mineral still requires no higher threshold level than in a normal bailing operation. As this feed back signal level is increased, the limiting factor to the speed of forming the drill hole 12 becomes maintaining the flushing mechanism 20–24; 20', 22', 50 of the present invention operating continuously, and the system of the present invention is able to do this. By incorporating the 10–18 inches Hg operating as a first threshold level, and the 0.5–4 inches Hg reset window or range, the problem of clogging and the attendant downtime is virtually eliminated in this type of mine operation. Generally, the lower the threshold level and the narrower the reset window, the more efficient operation is attainable. Also, while the threshold/reset control is contemplated as being efficiently handled by the controller 33, 33' equivalent threshold pressure/reset switches can be incorporated directly with the feed device 36, 36' and/or the drive unit 40, 40' if desired.

Summarizing the above, the drilling system of the present invention for continuously in-situ drilling and flushing of the drill cuttings/dust operates in a manner to provide maximum drilling efficiency. The drill stem/bit 10, 11 or 10', 11' feeds into the drill hole in a controlled manner through the operation of the feed device 36, 36' as controlled in response to the programmable controller 33, 33'. A flushing mechanism 20–24; 20', 22', 50 provides bailing fluid into the drill passage 20, 20' and picks up the cuttings/dust in a highly efficient manner for disposal. By sensing the negative or positive gauge pressure through the transducer 30, 30', the controller 33, 33' regulates the advancement of the drill head 15. Because the controller is programmed to anticipate an overload condition in the transfer duct 22, 22' the drilling can proceed without deleterious downtime. In addition to the feed of the drill head 15, 15', the spinner 16, 16' of the drill stem/bit can be regulated by the controller 33, 33'.

Figure 4:
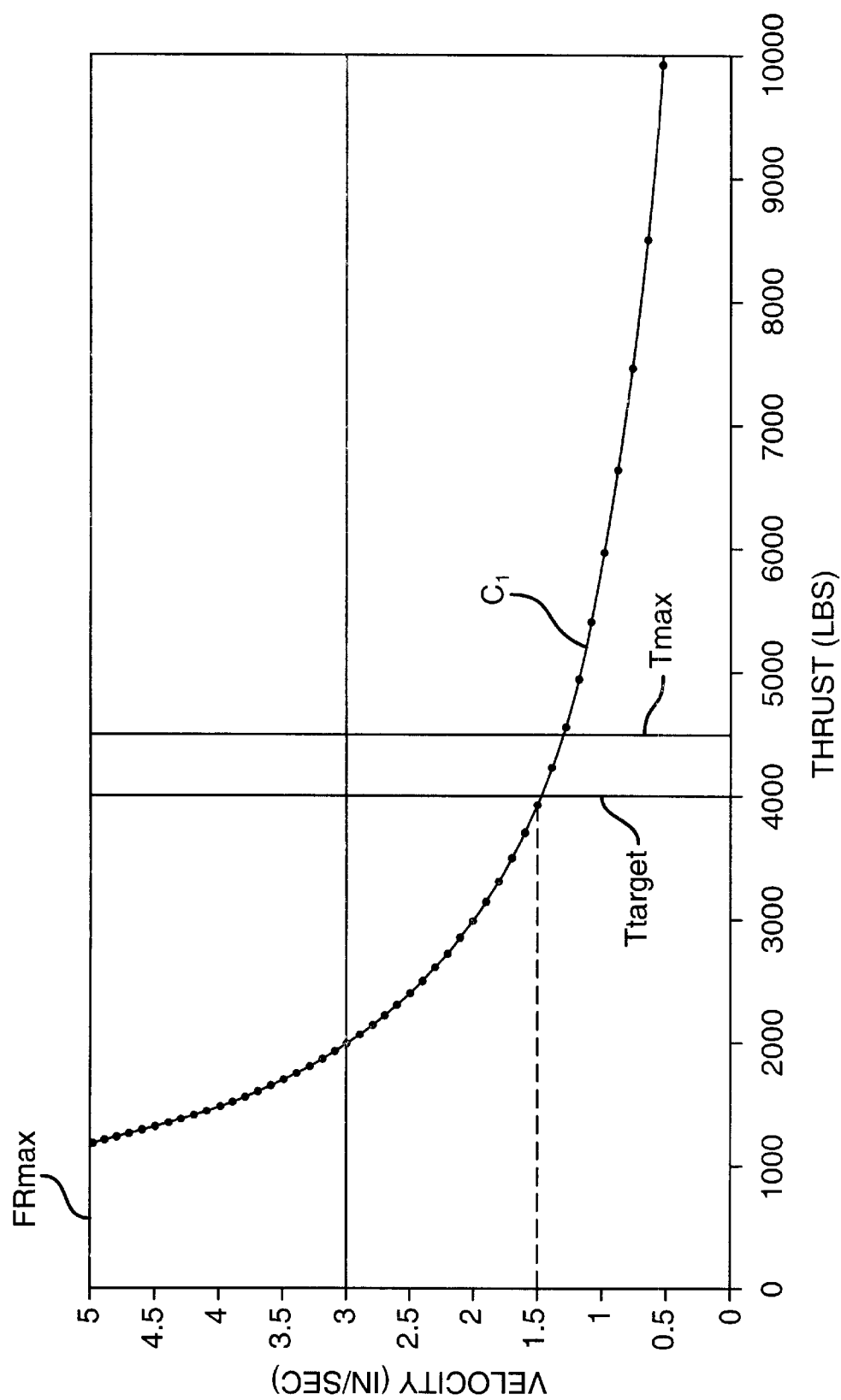
FIGS. 4–6 are exemplary graphs showing horsepower curves for use in automatically controlling the drilling operation that correlate the thrust acting on the bit to the feed rate.
Figure 5:
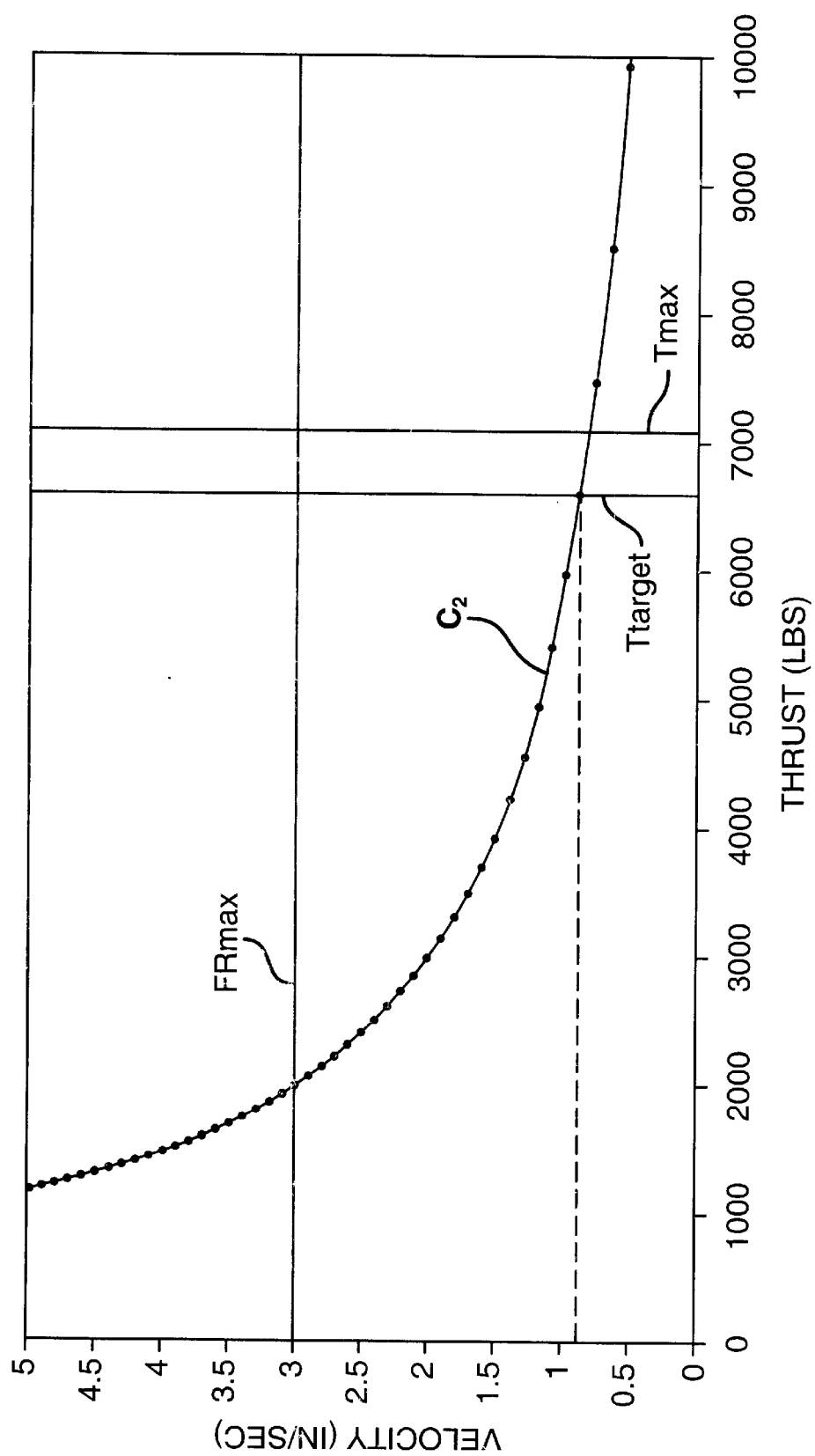
Figure 6:
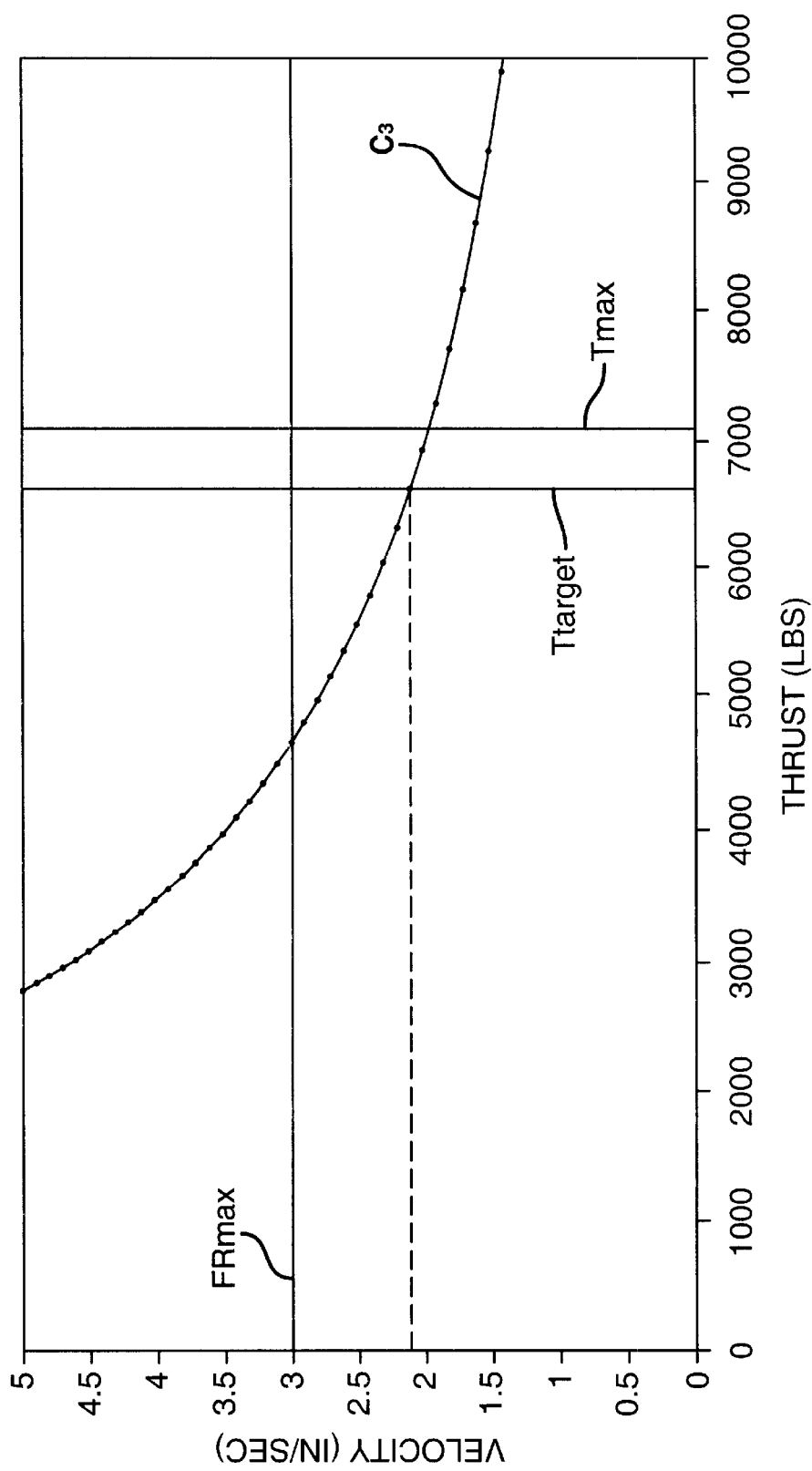
Figure 7:
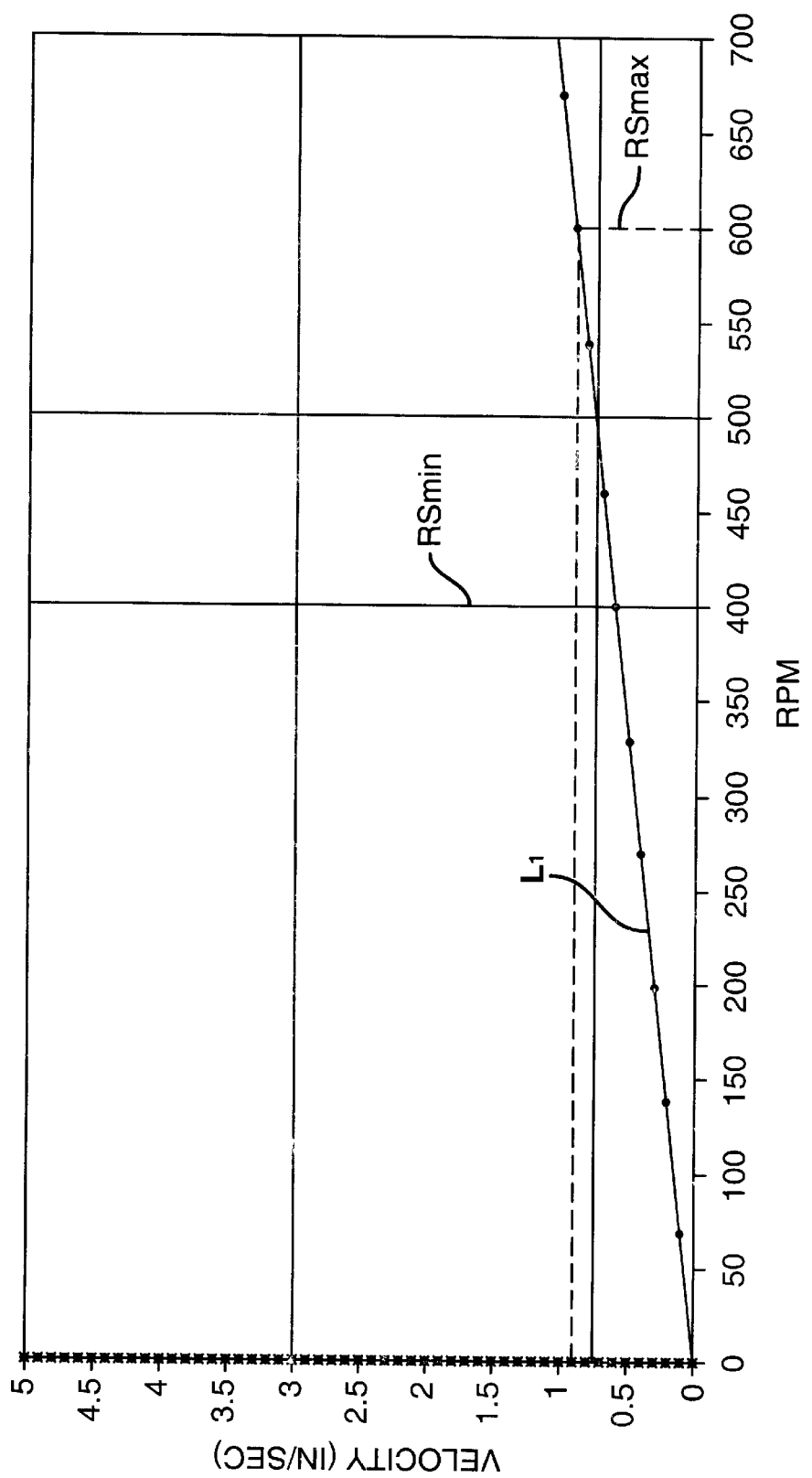
FIGS. 7–9 are exemplary graphs showing bite curves for use in automatically controlling the drilling operation that correlate the feed rate to the rotational speed of the selected drill bit.
Figure 8:
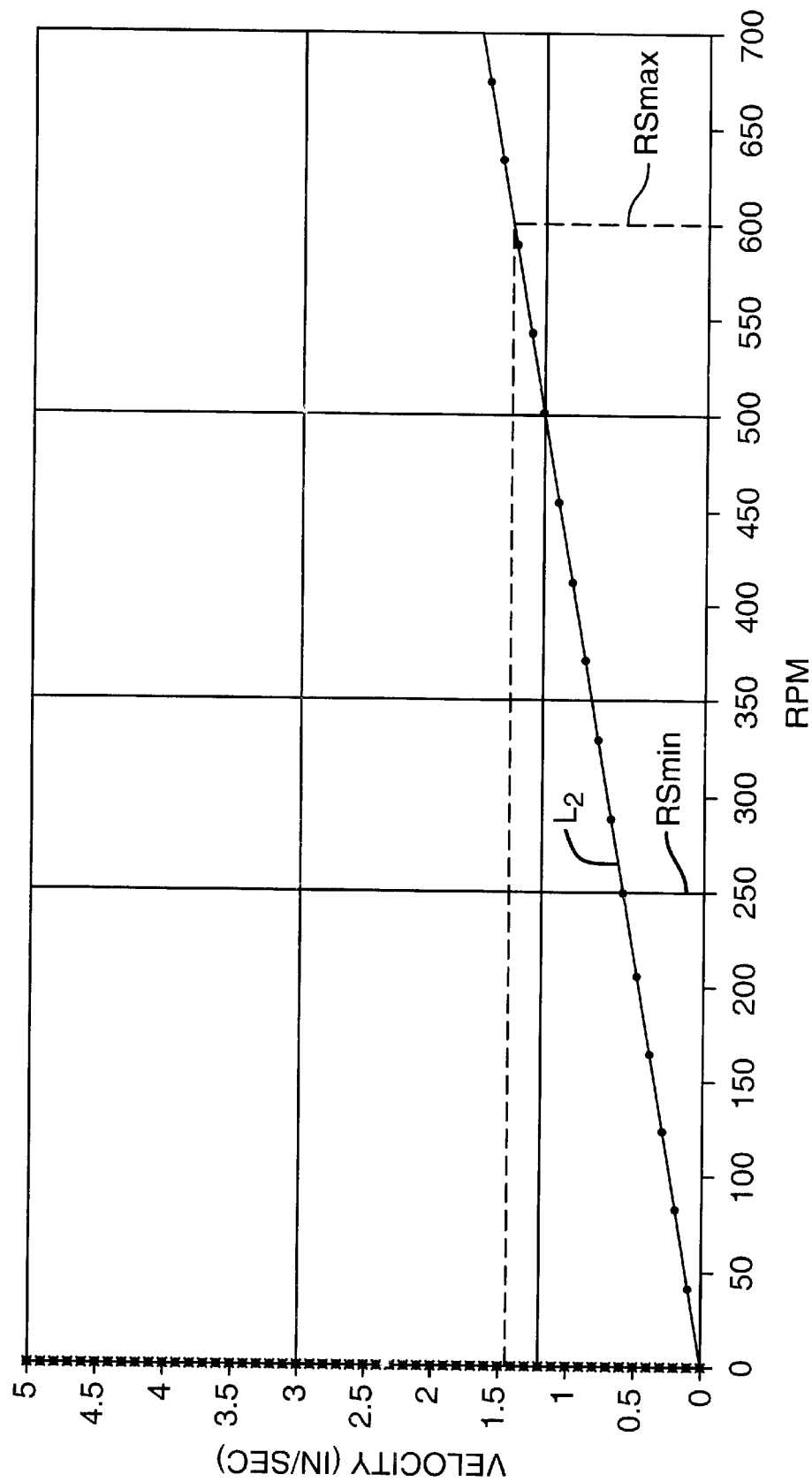
Figure 9:
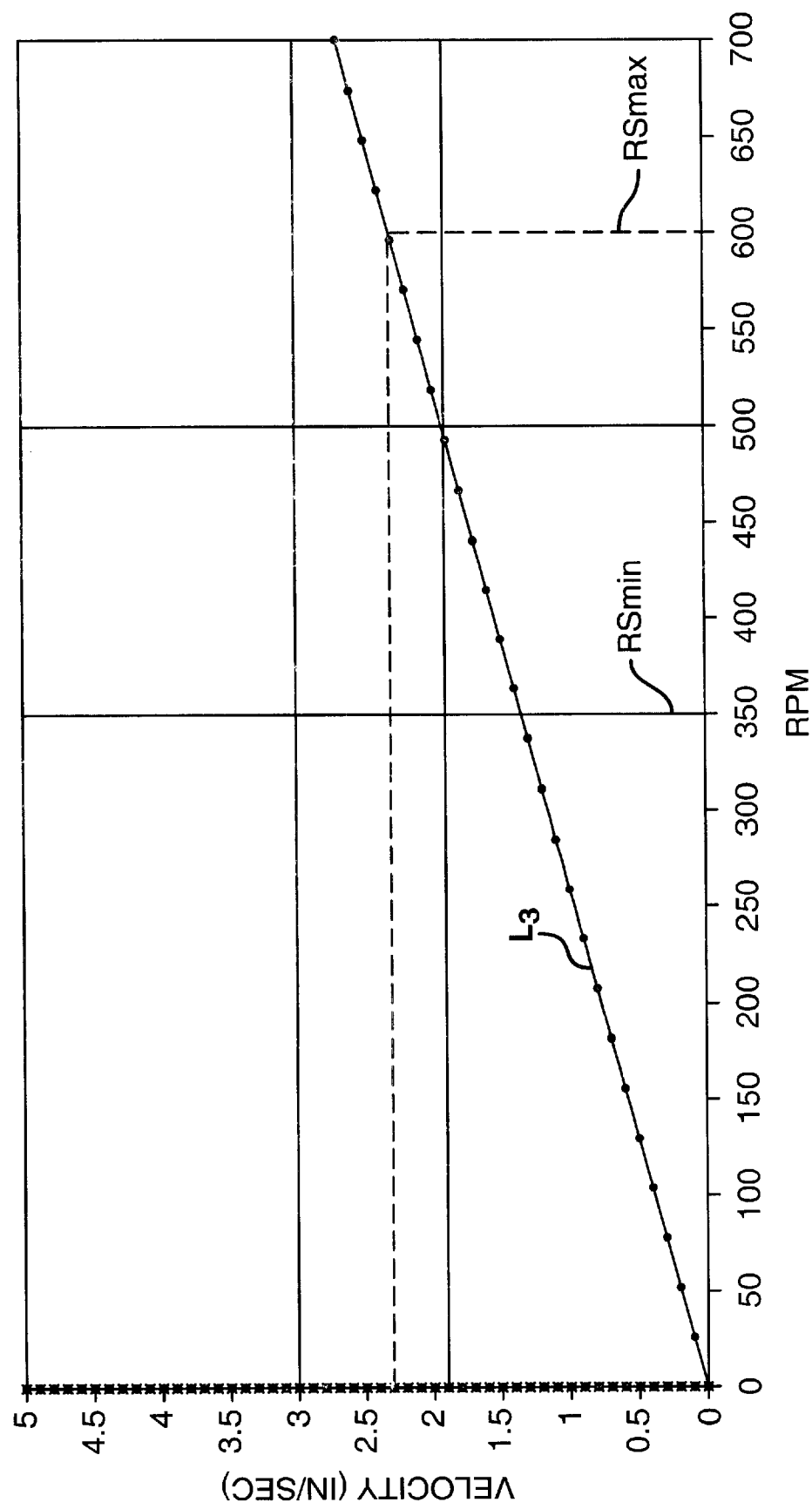

In accordance with another aspect of the invention, the feedback arrangement described above may be used in conjunction with enhanced computer control to further regulate the feed rate, driving rate, or various other aspects of the drilling operation. For example, the feeding or thrusting of the drill stem 10, 10' and bit 11, 11', and the corresponding bite in the hole thus formed, may be controlled as the drilling is in progress using the programmable controller 33, 33' as well. In particular, the controller 33, 33' is loaded with software representing a plurality of horsepower (HP) curves, which plot the feed rate against the thrust acting on the bit, as well as "bite" curves, which plot the rotational speed of the bit 11 as a function of the feed rate. Examples of the horsepower curves $C_1$, $C_2$, $C_3$ are shown in FIGS. 4–6 (corresponding to drilling in soft stratas, varying hard and soft stratas, and consistently hard stratas, respectively), and examples of the bite curves are shown in FIGS. 7–9 (representing similar conditions). Each horsepower curve is selected depending on the type of type of tool being used and the desired tool life/rate of bit consumption. The bite curve $L_1$, $L_2$, or $L_3$ is automatically chosen, such as from those shown in FIGS. 7–9, based on the feed rate dictated by the selected horsepower curve. These curves are based on empirical data; that is, data determined by actual experimentation, for a particular drill bit 11, 11' selected for use in drilling.

In operation, the drill operator first selects the horsepower, or HP, curve that most nearly matches the particular drill stem 10, 10' and bit 11, 11', which is chosen based on the particular strata being drilled, and the desired life of the tool (which of course corresponds directly to the amount of bit consumed during the drilling of the hole). Generally, the hydraulic system (FIG. 4) is governed by the formula:

$$\frac{GPM \times PSI}{1714} = HP = \frac{16 \times V \text{ (in/sec)}}{6600}$$

The points on the curves that best represent constant horsepower operation are tracked by the controller 33, 33'. For any given thrust or force (X-axis) pressed on the bit 11 (which may be determined by monitoring the feed pressure of a driving fluid using a sensor associated with the feed device 36, 36', see below), the controller 33, 33' automatically selects the corresponding feed rate (Y-axis) based on the selected curve. The rotational speed of the drill stem and bit 10/11 is then automatically selected based on the feed rate, in accordance with the appropriate bite curve.

The hydraulic actuator of head feed device 36 (FIG. 1), 36' (FIG. 2) is pressurized by a hydraulic pump 50 (see FIG. 3 also) generating a selected pressure (pounds per square inch/PSI in the formula). A directional control valve 51 (four-way) having a flow compensator or limiter adjusted by a solenoid 48 regulates the corresponding flow (gallons per minute/GPM in the formula) based on the thrust on the bit 11, 11'. The thrust is determined by monitoring the hydraulic pressure acting on the feed pressure sensor 37, 37' (transducer) associated with the actuator of the feed device 36, 36'. Based on the sensed thrust, the flow compensator or limiter of directional control valve 51 is adjusted to constantly regulate the flow (GPM) to control the feed rate in an effort to keep the feed horsepower at an optimum level. Indeed, the feed horsepower (HP) is preferably kept substantially constant during the entire drilling sequence, always being adjusted based on the selected curve, as necessary. As a result, the energy input is optimized and the life of the bit 11, 11' is maximized. This optimization also prevents overfeeding which may result in the bending of the drill stem 10 (or 10', see FIGS. 1, 2 and 3). In place of a feed pressure transducer, a load cell for directly reading the force experienced by the bit and providing a corresponding signal to the controller 33, 33' may be used.

As should be appreciated, the HP curves theoretically allow the drill bit 11, 11' to reach unreasonable upper levels of thrust (e.g., above 7,000 pounds) that might result in a catastrophic failure, even at a corresponding low feed rate. To prevent such high levels from being reached in practice, the controller 33, 33' is provided with a maximum thrust value $T_{max}$, as indicated in FIG. 4. In operation, the controller 33, 33' regulates the valve 51 to prevent the thrust from exceeding the $T_{max}$ value, which is theoretically or empirically determined for the particular bit 11, 11' selected. The $T_{max}$ value may be adjusted by the operator based on the particular drilling conditions.

In accordance with a more specific manner of controlling the drilling operation, a short delay in the time may exist between the sensing of a change in the thrust acting on the bit 11, 11' and the adjustment of the flow to avoid a catastrophic event, such as reaching $T_{max}$. To compensate for this hysterisis or delay in response time in the control system, the upper end of the thrust or force (X-axis) side of the curve is "clipped." In other words, a predetermined value of the feed pressure level corresponding to a thrust force below the maximum value $T_{max}$ is selected as a target value $T_{target}$. When this target value $T_{target}$ is reached, a corresponding adjustment is made using the electronic limit solenoid 48 to prevent deleterious overload. The electronic feedback signal is provided over line 52 to the controller 33, 33'.

When the thrust is low, such as in soft drilling, the feed rate may also increase along the HP curve to high levels (in FIG. 4, greater than 5 in/sec). However, such high levels are inefficient, since they merely serve to increase the energy input without improving the drilling operation, which is also limited by the rate at which the flushing mechanism can operate. To keep the feed rate at a reasonable level, a maximum feed rate $FR_{max}$ may also be provided as part of the controller 33, 33'. Initially, the particular number is set to be a reasonable goal for the particular drilling bit selected and the drilling conditions. As will be seen from the description that follows, this maximum feed rate $FR_{max}$ is actually the upper limit, with a number of lower levels of intermediate values being set based on other parameters, such as the performance of the flushing mechanism.

In addition to controlling the drilling operation by sensing a parameter, such as the feed pressure, corresponding to the thrust acting on the bit 11, 11' simultaneous drilling control based on the operation of the flushing mechanism for removing the cuttings and dust from the hole may also be incorporated. For example, as described above, a first threshold level of the gauge pressure sensed by transducer 30, 30' may be set corresponding to an approaching overload condition. If the controller 33, 33' senses that this first threshold level is crossed, the position of the valve 51 may be adjusted accordingly, such as to maintain the feed rate at the current level, reduce it, or prevent it from increasing. The chances of creating an overload on the flushing mechanism are thereby reduced. Hence, the first threshold level of the gauge pressure may also serve as a limit on the feed rate that the system imposes on the drill stem and bit 10, 10'/11, 11' during the drilling operation. In other words, in the embodiment of FIG. 1, if the negative gauge pressure approaches or reaches an unacceptable level, the controller 33, 33' may impose a feed rate upper limit that is below the maximum feed rate $FR_{max}$ previously set by the operator based on the drill bit 11, 11' or the particular drilling conditions.

In a more specific implementation of this dual control, and with reference to the embodiment of FIG. 1, the controller 33 may be programmed to sense if the gauge pressure is leveling off after the first threshold value is crossed, such as by sensing whether a predetermined range is exceeded. If it is, then the position of valve 51 may be regulated such that the feed rate remains at the current level, but no increase is permitted. Also, the controller 33 may be programmed to sense not only that the first threshold level is crossed, but also that the signal level corresponding to the negative gauge pressure is increasing to or above the upper limit of the range, in which case the valve 51 is adjusted to reduce the feed to a level necessary to prevent the anticipated overload.

To further ensure against clogging once the first threshold level is reached in either embodiment, the controller 33, 33' may also be programmed to signal a burst of speed to the motor of the rotary drive 40, 40' when the collection or flush mechanism approaches the capacity limit, as determined by the first threshold level of the gauge pressure. This also helps to prevent the drill bit 11, 11' from lugging and possibly overheating. The proper feed rate is reinstated once the pressure returns to an appropriate level, such as when bit 11, 11' comes into contact with the next layer of original rock material. In this case, the drill bit 11, 11' comes into contact at the slower rate, and damage that would otherwise occur by slamming against the top of the rock strata is avoided. Once engaged, the controller 33, 33' reinstates the increased feed rate and coordinated rotary speed of the drive 40, 40' using the selected HP and bite curves. By recording or logging the operation of this program routine by the controller 33, 33' an accurate mapping of the layers of earth material is made. Each void and soft material interface is noted providing better guidance when roof bolts are being set for roof control, for example.

A second threshold level of the gauge pressure may also be set, such as in the case of negative gauge pressure, above the predetermined range over the first threshold level. If this second threshold is reached, the controller 33, 33' not only stops the bit 11, 11' from feeding, but also retracts it from the hole a predetermined distance (e.g., 2 inches). Full rotation is also given to the drive unit 40, 40' in an effort to avoid the potential overload. The controller 33, 33' preferably maintains these conditions until the signal level corresponding to the gauge pressure drops back to an appropriate level (e.g., below the first threshold level), at which point the drilling operation resumes as normal by following the selected HP and bite curves.

As noted above, the system also includes a provision for bite control, as illustrated by the representative curves $L_1$, $L_2$, $L_3$ in FIGS. 7–9 that correspond to the HP curves $C_1$, $C_2$, $C_3$ of FIGS. 4–6. The bite curves $L_1$, $L_2$, $L_3$ coordinate the rate of feed imposed by the drill head feed device 36, 36' Y-axis and the rotational speed of the drill bit 11, 11' by the rotary drive device 40, 40', and thus serve to optimize the amount of earth material being removed per bit revolution. Similar to the feed side, a torque limit is imposed by a solenoid 60 for adjusting the flow compensator of a second directional control valve 61 (four-way) to control the operation of rotary drive device 40, 40', with an electronic signal indicative of the rotary speed (such as based on a sensor or transducer 41, 41' sensing the pressure of the driving fluid for driving the drive unit 40, 40') passing back to the controller 33 over line 63. The life of the bit 11, 11' is enhanced by also including this relationship in the programming of the controller 33, 33'. Another benefit of bite control is a significant reduction in amount of small size particles created by the drill bit 11, 11' in the hole. Specifically, the need for constantly slowing the drill bit 11, 11' in an effort to manually compensate for the drilling conditions is eliminated, which reduces the repeated grinding of the material as it is removed from the hole.

As should be appreciated from FIGS. 7–9, the bite curves are created such that the theoretical lower limit on the rotational speed is zero. However, in practice, allowing the rotational speed to drop below a certain minimum level may result in deleterious stalling. To prevent this, the controller 33, 33' is also programmed to include a minimum rotary speed, such as in revolutions per minute (e.g., 250 RPM), shown as $RS_{min}$ in FIGS. 7–9. The controller 33, 33' regulates the position of directional valve 61 to cause the drive unit 40, 40' to rotate the drill at or above this minimum rotary speed, regardless of the corresponding feed rate dictated by the selected HP curve. An equivalent result may be achieved by setting a minimum pressure in the controller 33, 33' for the fluid flow to the drive unit 40, 40', as determined by a sensor (not shown).

As should be appreciated by the foregoing, it is also possible, and actually preferable, to also set a maximum rotary speed $RS_{max}$ in the controller 33, 33'. Using this value, the controller 33, 33' prevents the valve 61 from opening beyond a certain point to control the flow of the driving fluid to the drive unit 40, 40'. As a result, overheating and damage to the stem 10, 10' and bit 11, 11' is prevented, as is excessive energy input.

A related feature of the invention is the capability of detecting a void in the strata, such as when breaking out of a layer of rock $S_1$, or other hard material, into a soft material, such as mud, gravel ($S_2$, $S_3$) or other soft material. This may be detected and recorded by the sudden reduction of the thrust, as detected by the feed pressure sensor of the drill head feed device 36, 36' (or in response to a sudden drop in back pressure as detected by the transducer 30 (or alternatively from the transducer 30')), coupled with an increase in the feed rate. The controller 33 is programmed to make the detection promptly, and then either immediately regulate the feed rate (in the case of automatic control), such as to keep it at a current rate, or a lower predetermined rate, or to actuate an alarm or warning to the operator (in the case of manual control) so that appropriate action may be taken.

As noted above, the drilling operation may also be logged throughout the operation using the sensed parameters, with any voids, cracks, or other defects in the strata being noted. In the case where the holes thus formed are used for supporting the roof or wall in a mine, examining the logs allows for the specialized selection of a support method based on the profile of the corresponding strata. Empirical data may also be gathered for use in the design of support systems in strata having similar characteristics.

The control circuit including controller 33, 33' may also include manual sensitivity and amount of feed rate adjustments, such as for adjusting the amount of the drop in thrust or the drop in back pressure required to trigger the step of regulating the feed rate or sounding an alarm warning of a void. These adjustments further reduce the chances for damaging the drill bit 11, 11' using automatic control. Also, this leads to less clogging of the dust collection system, when the FIG. 1 embodiment is used.

A low thrust condition may also be indicated by a reduction in hydraulic pressure (PSI) sensed by the feed pressure sensor (or a load cell) below a certain level, or at a lower level for a certain period of time. In response to detecting this condition, the controller 33, 33' may limit the maximum feed rate to a predetermined value corresponding to the low thrust condition, and possibly send an alert to the operator, such as by activating an alarm. In addition to optimizing the feed rate for drilling in softer materials where the thrust is consistently lower, this can avert problems due to operator error, such as if the drill guide is left open, excessive drill stem length is exposed outside the hole, or the drill hole is left uncollared.

Figure 10:
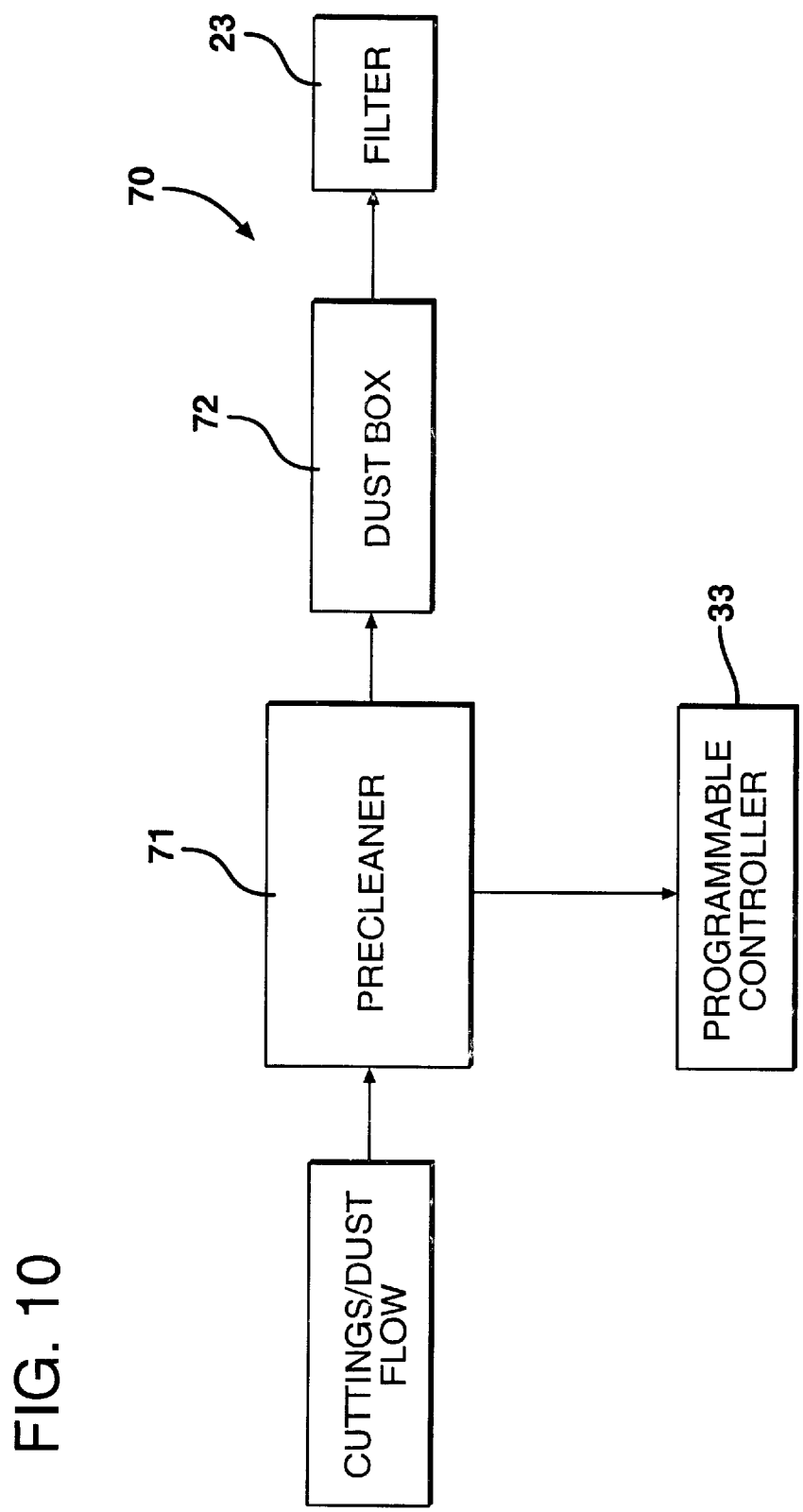
FIG. 10 is a schematic diagram showing one embodiment of a filtering system.

The controller 33, 33' can also be used to provide additional efficiency of the cuttings/dust collection system of FIG. 1, including any filtration system provided. In one embodiment, the controller 33, 33' reads the motion of the drill head feed device 36 during its retraction mode of the bit 11, such as using a position sensor 65. As shown in FIG. 10, the filtration system 70 includes a pre-cleaner 71 and dustbox 72, both for temporarily holding the cuttings/dust upstream of filter 23. Conventionally, the pre-cleaner 71 includes a door that is signaled to open, or "dump," its contents only at a particular point in the cycle, as determined by the operator. If the operator forgets or waits too long, deleterious clogging of the dust box and filter may result.

Using the enhanced computer control, the pre-cleaner 71 is automatically caused to eject or dump its contents, such as by opening the door associated therewith, at a particular point during the cycle. For example, the controller 33, 33' may signal the pre-cleaner 71 to empty when the stem/bit 10, 11 is withdrawn approximately 6 inches in the hole, as determined by the position sensor 65. Alternatively, the ejection function can be made responsive to a particular time after the stem/bit 10, 10'; 11, 11' is withdrawn from the hole, such as about 10 seconds after the position sensor 65 generates a corresponding signal, or at another point in the cycle (such as if a feed down signal is generated for a predetermined amount of time). In either case, the pre-cleaner 71 is preferably closed when the feed device 36 begins to feed the stem/bit 10, 10', 11, 11' back up into the hole. This control advantageously prevents the pre-cleaner 71 from overloading, in which case all the material collected would reach the filter 23 or dust box 72, both of which require deleterious manual cleaning in the event an overload occurs.

In a second embodiment, it is also possible to keep the pre-cleaner 71 open, and only close it according to a signal generated by the controller 33, 33' in response to a particular point in the cycle, such as reaching a particular depth in the hole. While this "normally open" embodiment has the advantage of reducing the noise at the adjacent operator station, it is somewhat less desirable than the "normally closed" embodiment, since control over the location and timing of the dump is lacking.

Figure 3:
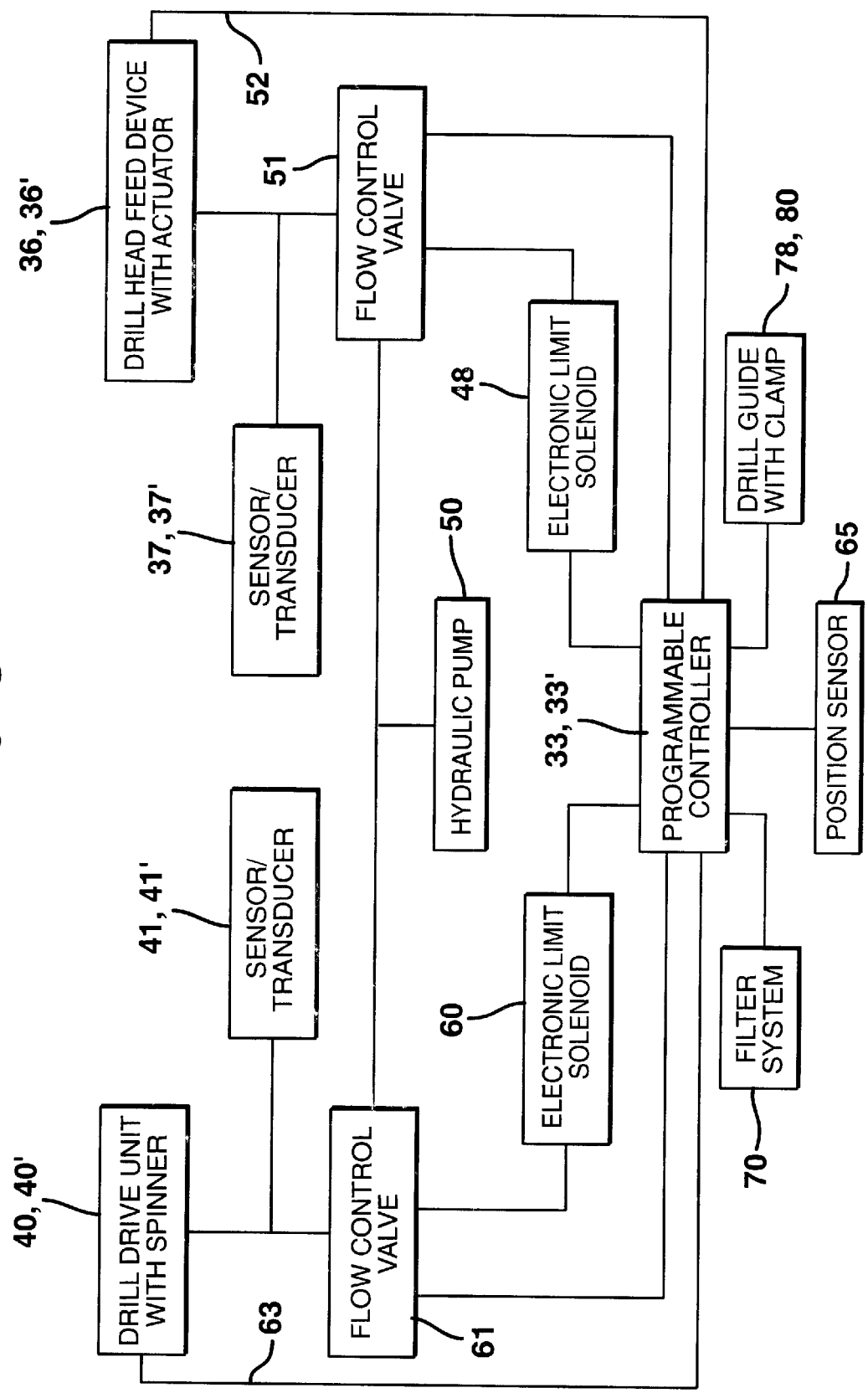
FIG. 3 is a schematic diagram showing one possible embodiment of the manner in which the controller may control first and section directional valves to adjust the flow of a driving fluid to each of the feed unit and the driving unit for generating the rotary motion for driving the drill stem and bit.
Figure 11A:
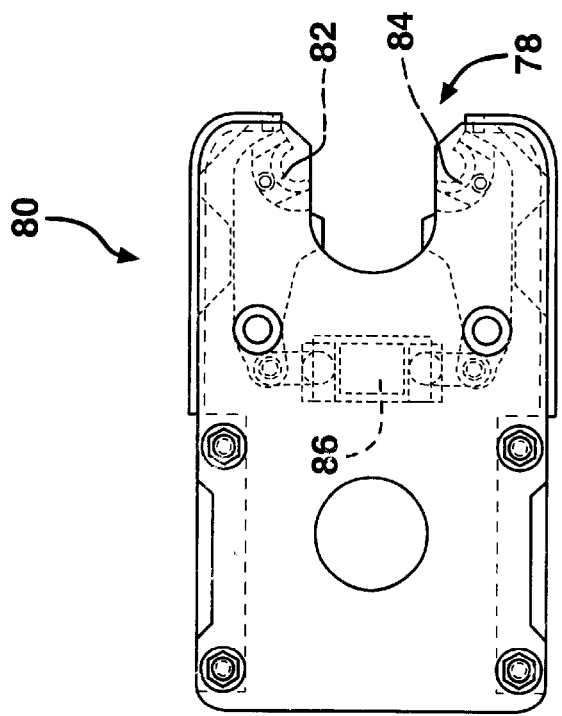
FIGS. 11a and 11b are top plan views of one embodiment of a drill guide including a clamp shown in both the open and closed positions.
Figure 11B:
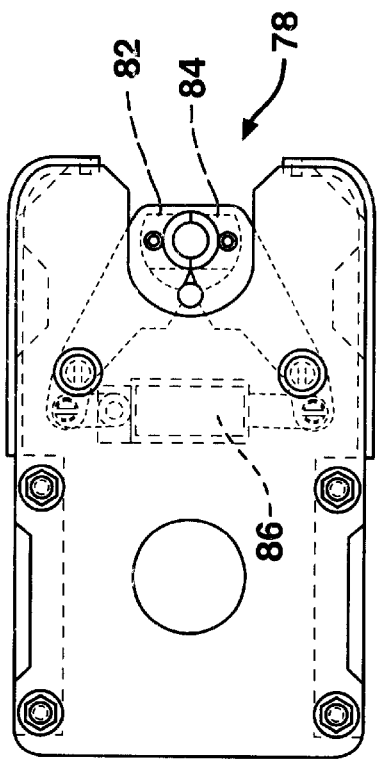

In accordance with another aspect of the invention, and as briefly noted above, it is also possible to automatically control the opening and closing of the clamp 78 forming a part of the drill guide 80, which is shown schematically in FIG. 3 and in top plan view in FIGS. 11a and 11b. For example, during collaring, the clamp 78 associated with the drill guide 70, which is typically formed of a pair of movable jaws 82, 84 carrying bushings for engaging the drill stem, may remain closed (see FIG. 11a) to guide the bit 11 and keep the hole as straight as possible. However, once the hole is formed to a predetermined distance, as may be determined from position sensor 65, the drill guide clamp 78 should be opened by a corresponding actuator 86 to prevent it from slowing the rotation of the stem 10, 10' and bit 11, 11', and hence formation of the hole. Opening is also required to remove the drill stem 11, 11', which is required to use the drill head 15, 15' during a bolting subroutine. To control this clamp 78, the output of the position sensor 65 associated with the bit 11, 11' and communicating with the controller 33, 33' may also be used to automatically open the clamp 78 forming a part of the drill guide 80 at a particular point in the cycle, such as when the drill bit 11, 11' is fed a certain distance or a up feed signal is provided for a predetermined amount of time. The control may also be used to close the clamp 78, such as when the bit 11, 11' is withdrawn from the hole or a feed down signal is provided for a predetermined amount of time.

As noted above, yet another aspect of the invention is to allow the operator to switch between automatic and manual control. To do so, an additional manual input device, such as a joystick 90, may be provided. The joystick 90 may be separate from the manual control 35 or 35' and connected by a lead line, as shown schematically in FIGS. 1 and 2, or the two may be combined into a single component. In one example, the operator may control the drilling operation using the joystick 90 during the preliminary stages, such as during collaring and until the bit forms the hole to a predetermined depth. Then, once a particular point in the process is reached, the operator may manipulate the input device, such as by pressing a button, to turn control of the drilling operation over to the controller 33, 33'. The controller 33, 33' then proceeds as described above to automatically control the drilling operation, for example according to the selected HP and bite curves, for a predetermined time or until a problem is detected. In either case, the controller 33, 33' may automatically switch off the system to stop the drilling operation in the event a particular condition or problem is encountered, at which time the operator may make any necessary adjustments and resume manual control.

The foregoing description of the several embodiments of the invention has been presented for purposes of illustration and description. The description is not intended to be exhaustive or to limit the invention to the precise form disclosed. Obvious modifications or variations are possible in light of the above teachings. These embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for substantially continuously forming a drill hole in the earth using a drill stem having a bit while flushing of the cuttings and dust from the drill hole, comprising:

a feed device for feeding the drill stem and bit at a feed rate to form the drill hole;

a flushing mechanism for flushing the cuttings and dust from the hole adjacent the stem by bailing fluid flow;

a transducer monitoring a pressure of the bailing fluid flow and generating a signal indicative of the level of said pressure;

a drive unit for establishing a rate of driving for the drill stem and bit; and a controller responsive to the signal from said transducer indicative of said pressure for regulating the rate of driving and the feed rate;

whereby said cuttings and dust are flushed in a controlled manner to substantially eliminate airborne contamination and provide the substantially continuous and optimum drilling operation.

2. The apparatus of claim 1, wherein said flushing mechanism includes a vacuum generator and a transfer duct for conveying the flow of cuttings and dust to a remote location, and said transducer senses a negative gauge pressure in said duct.

3. The apparatus according to claim 2, wherein said controller regulates the feed rate by continuously adjusting the position of a first valve controlling the flow of a driving fluid under pressure to the feed device dependent on the signal indicative of the negative gauge pressure maintained in said duct.

4. The apparatus according to claim 3, wherein the controller includes a first threshold level of the negative gauge pressure and adjusts the first valve to decrease the flow of the driving fluid and hence the feed rate when the signal level reaches the first threshold level.

5. The apparatus according to claim 4, wherein the controller prevents the first valve from opening further to increase the feed rate if the signal level of the negative gauge pressure remains within a predetermined range above the first threshold level.

6. The apparatus according to claim 5, wherein the controller adjusts the first valve to reduce the feed rate if the signal level of the negative gauge pressure exceeds an upper limit of the predetermined range above the first threshold level.

7. The apparatus according to claim 3, wherein the controller closes the first valve to stop the feeding of the drill bit and signals the feed unit to retract the drill stem and bit a predetermined distance when a second predetermined threshold level of the negative gauge pressure above the predetermined range is reached.

8. The apparatus according to claim 7, wherein the controller reopens the first valve to resume the feeding of the drill stem and bit once the signal level drops below the first threshold level.

9. The apparatus according to claim 3, wherein the feed rate is simultaneously regulated based on a signal level of a feed pressure sensor indicative of a feed pressure of the driving fluid, said feed pressure corresponding to a thrust acting on the bit.

10. The apparatus according to claim 9, wherein the controller includes a feed pressure level corresponding to a maximum thrust.

11. The apparatus according to claim 9, wherein the maximum feed pressure level is a target level below a predetermined upper limit of the feed pressure corresponding to a level of thrust that may result in excessive wear or damage to the drill stem and bit.

12. The apparatus of claim 9, wherein said drive unit is rotary and said drill stem and bit are adapted for rotary driving motion, said controller being operative for regulating the position of a second valve for controlling a second flow of fluid under pressure for regulating the rotational speed of the drill stem based on the feed rate set by the controller corresponding to the levels of the negative gauge pressure and the feed pressure signals.

13. The apparatus of claim 12, wherein the controller regulates the second valve such that the rotational speed of the drill stem and bit is kept at or above a predetermined minimum rotary speed or below a maximum rotary speed, regardless of the feed rate.

14. The apparatus of claim 1, wherein a passage is provided in said drill stem and bit for the bailing fluid flow, cuttings and dust, said passage communicating with a filtration system including a pre-cleaner for temporarily capturing at least one of the cuttings and dust flushed from the hole.

15. The apparatus of claim 14, wherein the pre-cleaner includes a closed position wherein at least the cuttings are captured in the pre-cleaner and an open position wherein at least the cuttings are dumped, wherein the pre-cleaner selectively adjusted between the open and closed position during the drilling operation by said controller.

16. The apparatus of claim 15, further including a sensor for sensing the position of the bit relative to the hole and providing a corresponding position signal to the controller, wherein said pre-cleaner is normally in a closed position and is opened by the controller in response to the bit reaching a predetermined position relative to the hole.

17. The apparatus of claim 16, wherein the pre-cleaner is automatically opened a predetermined time after retraction of the bit from the hole begins.

18. The apparatus of claim 1, further including:
a position sensor for sensing the position of the bit relative to the hole and providing a corresponding position signal to said controller;
a drill guide having a clamp that is selectively movable between an open and closed position by the controller in response to the position of the bit.

19. The apparatus of claim 1, wherein the controller is capable of switching between an automatic mode and a manual mode of operation, and further including a remote manual input device communicating with the controller for switching from the automatic mode to the manual mode and controlling of the drilling operation.

20. A method of substantially continuously drilling a drill hole by driving and feeding a drill stem and bit into the earth and flushing of the cuttings and dust from the hole using a bailing fluid flow, comprising the steps of:
monitoring through a transducer a pressure of the bailing fluid flow; and
substantially constantly regulating both the rate of driving and feeding based on the monitoring of the pressure during both a normal and an approaching overload condition;
whereby said cuttings and dust are flushed in a controlled manner to substantially eliminate airborne contamination and provide a substantially continuous and optimum drilling operation.

21. The method of claim 20, wherein the flushing is by vacuum and the pressure being monitored by the transducer is a negative gauge pressure.

22. The method according to claim 21, further including setting a first threshold level of the negative gauge pressure indicative of the approaching overload condition, and wherein the step of regulating the drilling comprises maintaining the feed rate at a predetermined level or decreasing the feed rate when the first threshold level is reached and simultaneously increasing the driving rate for a short period to avoid the approaching overload.

23. The method according to claim 22, wherein the step of regulating the feed rate of the drill bit further includes:
preventing an increase in the feed rate if the signal level of the negative gauge pressure remains within a predetermined range above the first threshold level; and
reducing the feed rate of the drill bit if the signal level of the negative gauge pressure exceeds an upper limit of the predetermined range.

24. The method according to claim 23, further including stopping the feeding of the drill bit and backing the drill bit out of the hole a predetermined distance when a second threshold level is reached that is above the predetermined range, and then resuming the feeding once the pressure returns to below the first threshold level, indicating the return to the normal condition.

25. The method according to claim 20, wherein the step of regulating the drilling further comprises simultaneously controlling the feed rate based on the pressure of the bailing fluid flow and a parameter of a second flow of fluid under pressure for activating a feed unit for feeding the drill stem and bit at the feed rate.

26. The method according to claim 25, wherein the step of regulating the drilling further comprises controlling a rotation rate of the drill stem and bit according to the feed rate.

27. The method of claim 20, further including providing a pre-cleaner for receiving the cuttings and dust from the hole in the bailing fluid, wherein the method further includes emptying the pre-cleaner either when the drill bit and stem reaches a predetermined position in the drill hole or at a predetermined time after a retraction of the drill stem and bit from the hole begins.

28. The method of claim 20, wherein the method further includes opening or closing a clamp forming a part of a drill guide based on a sensed position of the drill stem and bit relative to the hole.

29. A method for automatically controlling at least the feeding of a drill stem and bit being driven into the earth for forming a drill hole, comprising:
  feeding the drill stem and bit into the earth at a feed rate;
  flushing the cuttings and dust from the drill hole by bailing fluid flow;
  continuously monitoring a first parameter relating to a thrust acting on the drill bit during feeding and a second parameter relating to the bailing fluid flow;
  automatically regulating at least the feed rate during the forming of the drill hole based on at least one of the first and second parameters;
  whereby said cuttings and dust are flushed in a controlled manner to substantially eliminate airborne contamination and substantially continuous and optimum drilling operation is provided to reduce wear on and extend the service life of the bit.

30. The method according to claim 29, wherein the regulating step comprises continuously regulating the feed rate during feeding such that the level of the first parameter corresponds to an optimum level of thrust.

31. The method according to claim 30, wherein the feed rate is kept at or below a level corresponding to a target thrust that is less than a predetermined maximum amount of thrust that may result in excessive wear on the bit or bending of the drill stem.

32. The method according to claim 30, further including temporarily reducing the feed rate a predetermined amount, sounding an alarm, or making a record in a log when a substantial decrease in the first parameter occurs.

33. The method according to claim 32, wherein the amount of the substantial decrease in the first parameter is selectively adjustable.

34. The method according to claim 30, further including temporarily maintaining the optimum feed rate at or below a predetermined level when the first parameter is indicative of a low thrust condition.

35. The method according to claim 29, wherein the step of feeding includes simultaneously rotating the drill bit at a rotational speed, wherein the rotational speed is directly dependent on the feed rate.

36. The method according to claim 35, wherein the regulating step includes simultaneously preventing the rotational speed of the drill bit from dropping below a predetermined minimum rotary speed or exceeding a predetermined maximum rotary speed regardless of the feed rate.

37. The method according to claim 29, wherein said flushing is by vacuum and the second parameter being monitored is a negative gauge pressure of the bailing fluid flow.

38. The method according to claim 37, further including the steps of:
  setting a first threshold level of the negative gauge pressure and maintaining the feed rate at a predetermined level;
  preventing any increase in the feed rate if the signal level of the negative gauge pressure remains within a predetermined range above the first threshold level; and
  decreasing the feed rate if the signal level of the negative gauge pressure exceeds a predetermined range above the first threshold level.

39. The method according to claim 38, further including stopping the feeding of the drill bit and backing the drill bit out of the drill hole a predetermined distance when a second threshold level of the negative gauge pressure above the predetermined range is reached, and then resuming the feeding of the drill bit once the signal level drops below the first predetermined threshold level.

40. An apparatus for substantially automatically and continuously driving a drill stem having a bit into the earth to form a drill hole, comprising:
  a feed device for feeding the drill stem and bit at a feed rate to form the drill hole;
  a sensor monitoring a first parameter corresponding to the thrust acting on the drill bit and generating a first signal;
  a flushing mechanism for flushing cuttings and dust from the hole by bailing fluid flow;
  a transducer for monitoring a second parameter corresponding to the bailing fluid flow and the loading of the flushing mechanism and generating a second signal;
  a controller responsive to levels of the first and second signals for substantially automatically and continuously regulating the fluid flow to the feed device to adjust at least the feed rate;
  whereby regulating the feed rate corresponding to the flushing mechanism and the thrust acting on the drill stem and bit enhances the drilling operation.

41. The apparatus according to claim 40, wherein the first parameter is a feed pressure of a first flow of a driving fluid for driving the feed device and the sensor is a feed pressure sensor, and further including a first valve that is adjusted by the controller to regulate the first flow to maintain an optimum feed rate corresponding to the level of the first signal indicative of an optimum level of thrust.

42. The apparatus according to claim 41, wherein the position of first valve is adjusted by the controller to maintain the first flow such that the drill bit is initially fed at a preselected feed rate, and then the position of the first valve is selectively adjusted by the controller during feeding in accordance with the first signal to regulate the first flow until an optimum feed rate corresponding to the optimum level of thrust experienced by the drill bit is reached, whereby drill bit consumption is minimized.

43. The apparatus according to claim 42, wherein the optimum feed rate is a target feed rate corresponding to the optimum level of thrust that is less than a predetermined maximum thrust at which the drill bit is subject to excessive wear or overheating.

44. The apparatus according to claim 41, wherein the first valve is adjusted to reduce the first flow and decrease the feed rate from the optimum feed rate a predetermined amount when a substantial decrease in the feed pressure signal is detected by the controller.

45. The apparatus according to claim 44, wherein the amount of the substantial decrease in the feed pressure signal required to cause the controller to reduce the feed rate and the predetermined amount of the reduction in the feed rate are both selectively adjustable.

46. The apparatus according to claim 41, wherein the controller adjusts the first valve to limit the first flow and hence the feed rate when the feed pressure falls below a predetermined value corresponding to a low thrust condition.

47. The apparatus according to claim 41, further including a drive unit for driving the drill bit at a rotational speed that is regulated by the controller by adjusting the position of a second valve through which a second flow of a driving fluid under pressure passes to the drive unit, and the controller continuously regulates the position of the second valve to maintain the rotational speed at an optimum level based on the feed rate.

48. The method according to claim 47, wherein the controller prevents the second valve from closing such that the rotational speed drops below a minimum level or opening such that the rotational speed exceeds a maximum level regardless of the feed rate.

49. The apparatus according to claim 40, wherein the second parameter is a negative gauge pressure of the bailing fluid flow, and the controller includes a first threshold level of the gauge pressure indicative of an approaching overload condition and adjusts a first valve regulating a first flow of a driving fluid under pressure to the feed device to decrease the feed rate when the second signal level reaches the first threshold level.

50. The apparatus according to claim 49, wherein the controller:
   maintains the first valve at a current position or prevents the first valve from opening to increase the feed rate if the gauge pressure remains within a predetermined range above the first threshold level;
   partially closes the first valve to reduce the feed rate if the signal level of the gauge pressure exceeds a predetermined range above the first threshold level; and
   closes the first valve to stop the feeding of the drill bit and signals the feed unit to back the drill bit out of the hole a predetermined distance when a second threshold level of the gauge pressure above the predetermined range is reached, and then opens the first valve to resume the feeding of the drill bit once the signal level drops below the first threshold level.

51. A method for automatically controlling at least the feeding of a drill stem and bit being driven into the earth for forming a drill hole, comprising:
   feeding the drill stem and bit into the earth at a feed rate;
   driving the drill bit into the earth at a drive rate;
   flushing cuttings and dust from the drill hole by bailing fluid flow;
   continuously monitoring a first parameter relating to a thrust acting on the drill bit during feeding and a second parameter relating to the bailing fluid flow;
   automatically regulating the feed rate during the forming of the drill hole based on at least one of the first and second parameters; and
   automatically regulating the drive rate based on the feed rate;
   whereby the cuttings and dust are flushed in a controlled manner to substantially eliminate airborne contamination and substantially continuous and optimum drilling operation is provided to reduce wear on and extend the service life of the bit.

52. The method according to claim 51, wherein the step of regulating the drive rate includes simultaneously preventing a rotational speed of the drill bit from dropping below a predetermined minimum rotary speed or exceeding a predetermined maximum rotary speed regardless of the feed rate.

53. The method according to claim 51, wherein the step of monitoring a second parameter comprises monitoring a negative gauge pressure of the bailing fluid flow.

54. An apparatus for substantially automatically and continuously driving a drill stem having a bit into the earth to form a drill hole, comprising:
   a feed device for feeding the drill bit at a feed rate to form the drill hole;
   a driving device for driving the drill bit at a drive rate;
   a sensor monitoring a first parameter relating to the thrust acting on the drill bit and generating a first signal;
   a flushing mechanism for flushing cuttings and dust from the hole by bailing fluid flow;
   a transducer for monitoring a second parameter corresponding to the bailing fluid flow and the loading of the flushing mechanism and generating a second signal;
   a controller responsive to levels the first and second signals for substantially automatically and continuously regulating the feed rate and regulating the drive rate based on the feed rate;
   whereby regulating the feed rate and drive rate corresponding to the flushing mechanism and the thrust acting on the drill bit enhances the drilling operation.

55. A method for controlling a drilling operation including a drill bit being driven into the earth to form a drill hole, comprising:
   driving the drill bit at a drive rate;
   feeding the drill bit at a feed rate;
   monitoring a thrust force acting on the drill bit;
   automatically modifying the feed rate to maintain the thrust force within a first predetermined acceptable range of forces for the drill bit; and
   automatically modifying the drive rate within a second predetermined acceptable range of rotational speeds based on the feed rate;
   whereby modifying the feed rate according to the thrust force acting on the bit and modifying the drive rate according to the feed rate improves the efficiency of the drilling operation.

56. The method according to claim 55, wherein the step of automatically modifying the drive rate within the second predetermined range includes simultaneously preventing a rotational speed of the drill bit from dropping below a predetermined minimum rotary speed or exceeding a predetermined maximum rotary speed regardless of the feed rate.

57. The method according to claim 55, further including the step of determining the first predetermined acceptable range of forces using empirical data.

58. The method according to claim 55, wherein the step of monitoring the thrust force acting on the drill bit is accomplished by detecting a pressure of a working fluid used to drive a feed device for feeding the drill bit at the feed rate.

59. The method according to claim 55, wherein the step of monitoring the thrust force acting on the drill bit is accomplished using a load sensor.

* * * * *